US012331554B2

(12) United States Patent
Bostrom

(10) Patent No.: US 12,331,554 B2
(45) Date of Patent: Jun. 17, 2025

(54) LATCHING MECHANISM

(71) Applicant: Gary Michael Bostrom, Merced, CA (US)

(72) Inventor: Gary Michael Bostrom, Merced, CA (US)

( * ) Notice: Subject to any disclaimer, the term of this patent is extended or adjusted under 35 U.S.C. 154(b) by 283 days.

(21) Appl. No.: 17/478,915

(22) Filed: Sep. 18, 2021

(65) Prior Publication Data

US 2023/0109582 A1 Apr. 6, 2023

(51) Int. Cl.

| | |
|---|---|
| ***E05B 67/36*** | (2006.01) |
| ***E05B 13/00*** | (2006.01) |
| ***E05B 65/06*** | (2006.01) |
| ***E05B 67/38*** | (2006.01) |
| ***E05B 85/22*** | (2014.01) |

(52) U.S. Cl.

CPC ............ *E05B 65/06* (2013.01); *E05B 13/002* (2013.01); *E05B 67/36* (2013.01); *E05B 85/22* (2013.01); *E05B 67/383* (2013.01); *E05Y 2900/132* (2013.01)

(58) Field of Classification Search

CPC .... E05B 67/383; E05B 67/36; E05B 65/0007; E05B 65/06; E05B 65/48; E05B 65/5284; E05B 65/0894; E05B 17/20; E05B 63/18; E05B 55/00; E05B 85/10; E05B 13/002; E05C 19/007; E05C 19/18; E05C 19/188

USPC ................................ 70/416, 224, 39, 32, 33

See application file for complete search history.

(56) References Cited

U.S. PATENT DOCUMENTS

| | | | | | |
|---|---|---|---|---|---|
| 719,705 | A * | 2/1903 | Vallee | E05B 55/00 | 70/108 |
| 934,702 | A * | 9/1909 | Thomas | E05B 55/00 | 292/DIG. 52 |
| 1,894,913 | A * | 1/1933 | Sadler | E05C 1/04 | 292/205 |
| 3,334,933 | A * | 8/1967 | Ehlers | E05C 1/04 | 292/148 |
| 3,901,058 | A * | 8/1975 | Best | E05B 67/36 | 70/32 |
| 3,995,459 | A * | 12/1976 | Weeks | E05B 63/121 | 70/34 |
| 4,754,626 | A * | 7/1988 | Siegel | E05B 67/36 | 70/32 |

(Continued)

FOREIGN PATENT DOCUMENTS

| | | | |
|---|---|---|---|
| GB | 191405130 | A * | 2/1915 |
| GB | 372457 | A * | 5/1932 |

*Primary Examiner* — Kristina R Fulton
*Assistant Examiner* — Emily G. Brown
(74) *Attorney, Agent, or Firm* — George B Leavell

(57) ABSTRACT

A latching mechanism system, method and apparatus is disclosed. The latching mechanism including a latch mechanism shaft and a rotatable outer actuator knob. The outer actuator knob including at least one outer actuator knob engagement surface. The at least one outer actuator knob engagement surface having a shape corresponding to a lock body engagement surface of a removable lock. The outer actuator knob can be mounted on the latch mechanism shaft, proximate to a first end of the latch mechanism shaft. The outer actuator knob being capable of rotating the latch mechanism shaft. The removable lock is capable of being secured in a locked position with the lock body engagement surface proximate to the least one outer actuator knob engagement surface.

14 Claims, 18 Drawing Sheets

(56) References Cited

U.S. PATENT DOCUMENTS

| | | | | | |
|---|---|---|---|---|---|
| 5,172,574 | A * | 12/1992 | Perfetto | E05B 67/38 292/281 | |
| 5,201,202 | A * | 4/1993 | Kam | E05B 13/001 70/168 | |
| 6,748,776 | B2 * | 6/2004 | Bullock | E05B 13/002 292/336.3 | |
| 7,484,390 | B1 * | 2/2009 | Finkelstein | E05C 1/06 70/92 | |
| 8,312,748 | B2 * | 11/2012 | Bundy | E05C 19/182 70/416 | |
| 2010/0102573 | A1 * | 4/2010 | Rancatore | E05B 13/00 292/147 | |
| 2011/0252838 | A1 * | 10/2011 | Stuckey | E05B 67/383 70/20 | |
| 2017/0247914 | A1 * | 8/2017 | Waugh | E05B 67/383 | |

* cited by examiner

LATCHING MECHANISM

FIELD OF THE DISCLOSURE

The present disclosure relates generally to latching and locking mechanisms, and more particularly, to methods and systems for secure, tamper-resistant latching and locking mechanisms.

BACKGROUND

Doorways, gateways and other types of entries typically use corresponding doors and gates to close the opening of the doorways and gateways. Various types of latching mechanisms are used to hold the doors and gates in the closed orientation in the doorway or gateway. The latching mechanisms typically engage a strike plate or opening within or on a frame of the doorway or gateway. The strike plate or opening is aligned with the latching mechanisms in the closed orientation. Examples of latching mechanisms include a sliding or cross bolt, a common doorknob and the corresponding rotationally activated bolt.

The latching mechanisms can also be used to hold the doors and gates in an opened orientation by engaging a second strike plate or second opening in a second position that aligns with the latching mechanisms when the doors and gates are in the opened orientation.

A latching mechanism can also include or can be used in combination with various locking mechanisms for securing the doors and gates in the closed orientation in the doorway or gateway or in the opened orientation. FIG. 1A is a typical diagram of a prior art doorway 101. The doorway 101 includes a door frame 105, a hinged and latching door 102 secured to the door frame with hinges 104 on a hinging side and a typical latch mechanism 103 on the side opposite from the hinges.

FIGS. 1B and 1C are detailed views of a Detail 1B, from prior art FIG. 1A. Detail 1B shows the typical latch mechanism 103 in a latched orientation. The latch mechanism 103 includes an operating handle 110 rotatably coupled to a latching bolt 114. In the latched orientation, the latching bolt 114 extends out of the door 102 and into a strike plate opening 116 in the door frame 105, thus securing the door 102 in the closed orientation in the doorway 101.

The latch mechanism 103 also includes a locking mechanism 112 that, in a locked orientation, prevents the operating handle 110 from moving the latching bolt 114 thus locking the door 102 in the doorway 101. The locking mechanism 112 includes a keyway 113 for receiving a key (not shown) that can actuate the locking mechanism in a locked orientation and, alternatively, in an unlocked orientation.

FIG. 1C shows Detail 1B' showing the latch mechanism 103 in an unlatched orientation. The locking mechanism 112 is the unlocked orientation, thus allowing the operating handle 110 to move. As shown in Detail 1B', the operating handle 110 is rotated in direction 118, from latched position, shown in phantom, to unlatched position 110', which causes the latching bolt 114 to withdraw from strike plate opening 116 in the door frame 105, in direction 120, to place the latching bolt in the unlatched orientation, thus allowing the door 102 to pivot on the hinges 104, shown in FIG. 1A, from the closed orientation, in the doorway 101, to an open orientation.

Latch and locking mechanisms can be bent, broken, cut and otherwise defeated via numerous types of attacks and forces. It is in this context that the following embodiments arise.

SUMMARY

Broadly speaking, the present disclosure fills these needs by providing a latching mechanism and a system and method for latching a gate or door. It should be appreciated that the present disclosure can be implemented in numerous ways, including as a process, an apparatus, a system, computer readable media, or a device. Several inventive embodiments of the present disclosure are described below.

In at least one implementation, latching mechanism is disclosed. The latching mechanism including a latch mechanism shaft and a rotatable outer actuator knob. The outer actuator knob including at least one outer actuator knob engagement surface. The at least one outer actuator knob engagement surface having a shape corresponding to a lock body engagement surface of a removable lock. The outer actuator knob can be mounted on the latch mechanism shaft, proximate to a first end of the latch mechanism shaft. The outer actuator knob being capable of rotating the latch mechanism shaft. The removable lock is capable of being secured in a locked position with the lock body engagement surface proximate to the least one outer actuator knob engagement surface. The latch mechanism mount plate can include a shaft opening, wherein the latch mechanism shaft passes through the shaft opening.

The latching mechanism can also include a shroud coupled to the latch mechanism mount plate. The shroud is disposed surrounding at least two portions of the outer actuator knob. The shroud has a shroud width greater than an outer actuator knob width.

The outer actuator knob can be disposed on the latch mechanism shaft such that an outer surface of the outer actuator knob has an outer actuator knob height relative to the latch mechanism mount plate. The shroud can include a shroud height relative to the latch mechanism mount plate, wherein the shroud height is equal to or greater than the outer actuator knob height. The shroud includes a lock opening, having a lock opening width between about 0.2 mm and about 10 mm greater than a width of the removable lock.

The shroud can have a substantially round shape or a substantially rectangular shape or any other suitable shape and combinations thereof. The shroud can have an inner width of between about 20 mm and about 80 mm greater than a diameter of the outer actuator knob.

The latching mechanism can also include at least one latch mechanism coupling coupled to the latch mechanism shaft. The latch mechanism mount plate is disposed between the outer actuator knob and the at least one latch mechanism coupling. The lock body engagement surface can be substantially flat and the at least one outer actuator knob engagement surface can be correspondingly substantially flat.

The removable lock can include a u-shaped shackle capable of encompassing the latch mechanism shaft. The removable lock can include a first side, the first side including a shackle cavity. The latch mechanism mount plate can include a metal loop positioned to align with the shackle cavity when the removable lock is positioned with the lock body engagement surface proximate to the at least one outer actuator knob engagement surface. The metal loop can include a shackle opening aligned with the metal loop when the removable lock is positioned with the lock body engagement surface proximate to the at least one outer actuator knob engagement surface.

The lock body engagement surface can have a convex shape having a first radius and wherein the at least one outer actuator knob engagement surface can have a concave shape having a second radius substantially equal to the first radius. In an alternative implantation, the lock body engagement surface can have a convex shape having a first radius and wherein the at least one outer actuator knob engagement surface can have a concave shape having a second radius not more than about 5 mm greater than the first radius.

The latching mechanism can also include an inner actuator knob mounted on the latch mechanism shaft proximate to a second end of the latch mechanism shaft, the second end of the latch mechanism shaft being opposite from the first end of a latch mechanism shaft.

In at least one implementation, the latch mechanism mount plate is a portion of a surface of a door. In at least one implementation, the at least one outer actuator knob engagement surface includes an engagement surface thickness between about 5 mm and about 40 mm.

In another implementation, a latching mechanism is described. The latching mechanism includes a latch mechanism mount plate including a shaft opening, a latch mechanism shaft, wherein the latch mechanism shaft passes through the shaft opening, an outer actuator knob, including at least one concave outer actuator knob engagement surface. The outer actuator knob is disposed on the latch mechanism shaft such that an outer surface of the outer actuator knob is an outer actuator knob height relative to the latch mechanism mount plate. The latching mechanism also includes a shroud coupled to the latch mechanism mount plate, wherein the shroud is disposed surrounding the outer actuator knob. The shroud can include a lock opening, the lock opening having a lock opening having a width between about 0.2 mm and about 5 mm greater than a width of the lock body. The shroud can also include a shroud height relative to the latch mechanism mount plate, the shroud height is equal to the outer actuator knob height. The latching mechanism also includes a metal loop disposed in the lock opening, metal loop coupled to the latch mechanism mount plate, and the lock body of the removable lock includes a first side, the first side including a shackle cavity and a straight shackle passing through the shackle cavity, the metal loop aligns with the shackle cavity when the removable lock is placed in the lock opening with a convex lock body engagement surface of the lock body proximate to the at least one concave outer actuator knob engagement surface.

In another implementation, a door latch system is described. The door latch system includes an outer surface of a door. The outer surface includes a shaft opening. A latch mechanism shaft passes through the shaft opening. An outer actuator knob includes at least one outer actuator knob engagement surface. The at least one outer actuator knob engagement surface includes a shape corresponding to a lock body engagement surface of a removable lock. The removable lock is capable of being secured with the lock body engagement surface proximate to the least one outer actuator knob engagement surface. The door latch system also includes at least one latch mechanism coupling coupled to the latch mechanism shaft. The outer surface of a door is disposed between the outer actuator knob and the at least one latch mechanism coupling. At least one sliding bolt is pivotally coupled to the at least one latch mechanism coupling.

In another implementation, a method of locking a latching mechanism is described. The method of locking a latching mechanism includes placing an outer actuator knob in a latched orientation and securing a lock body engagement surface of a removable lock proximate to an least one outer actuator knob engagement surface, the at least one outer actuator knob engagement surface including a shape corresponding to a shape of the lock body engagement surface.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

DETAILED DESCRIPTION

Several exemplary embodiments for latching mechanism and a system and method for latching a gate or door will now be described. It will be apparent to those skilled in the art that the present disclosure may be practiced without some or all of the specific details set forth herein.

Typical latching mechanisms are mechanically weak and easily defeated by brute force. The various implementations of latching mechanisms described herein are very robust, relatively simple and still significantly more difficult to defeat due to various, innovative improvements over typical latching mechanisms.

Figure 1A:
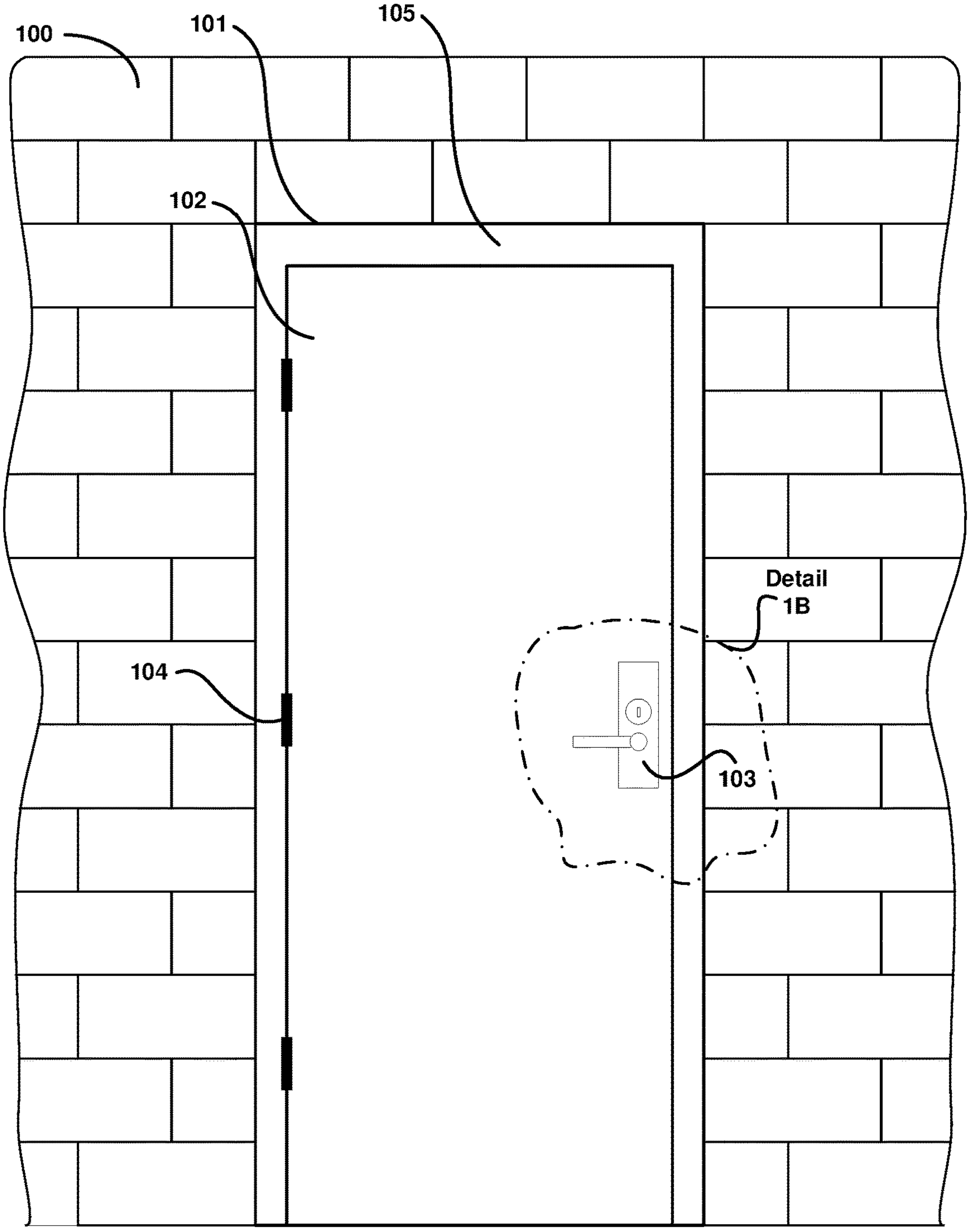
FIGURE 1A Prior Art
FIG. 1A is a typical diagram of a prior art doorway 101.
Figure 1C:
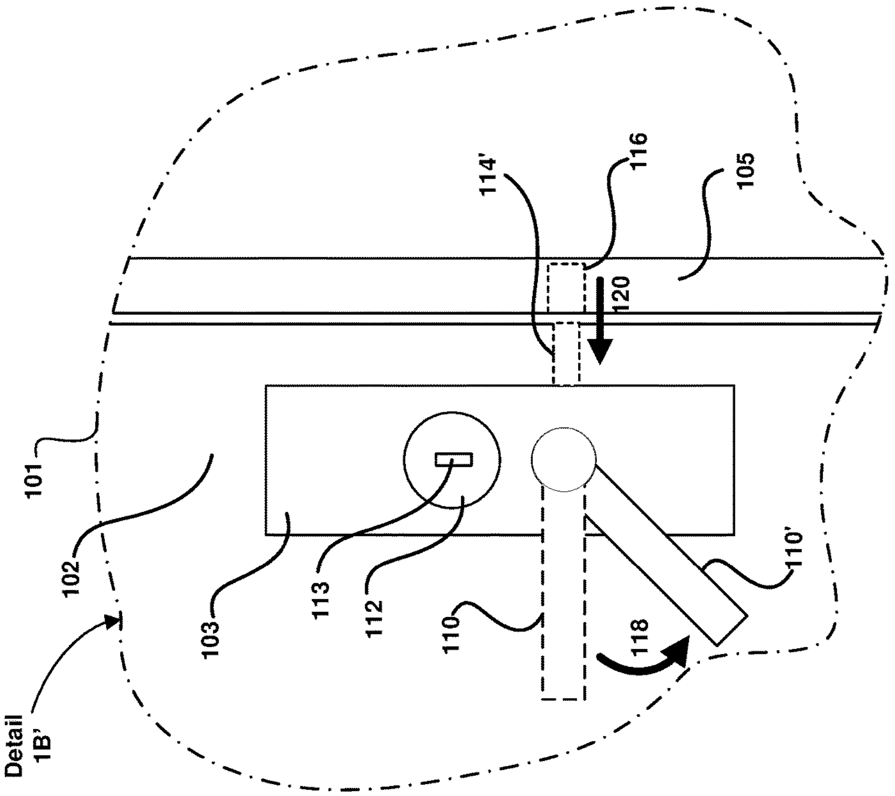
FIGURE 1C Prior Art
FIGS. 1B and 1C are detailed views of a Detail 1B, from prior art FIG. 1A.
Figure 1B:
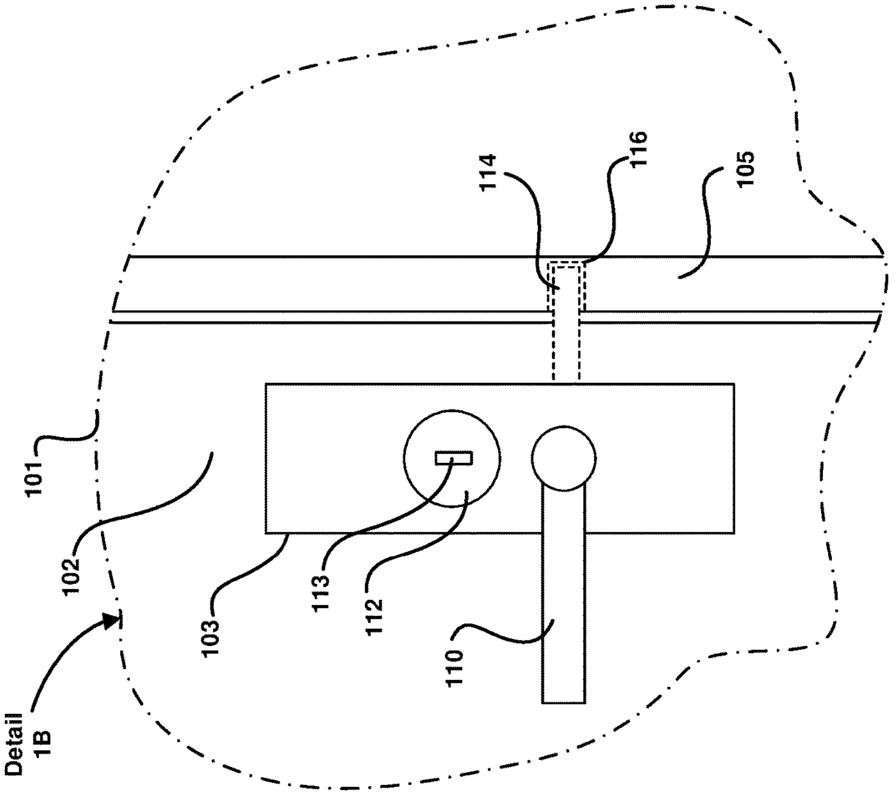
FIGURE 1B Prior Art
Figure 2:
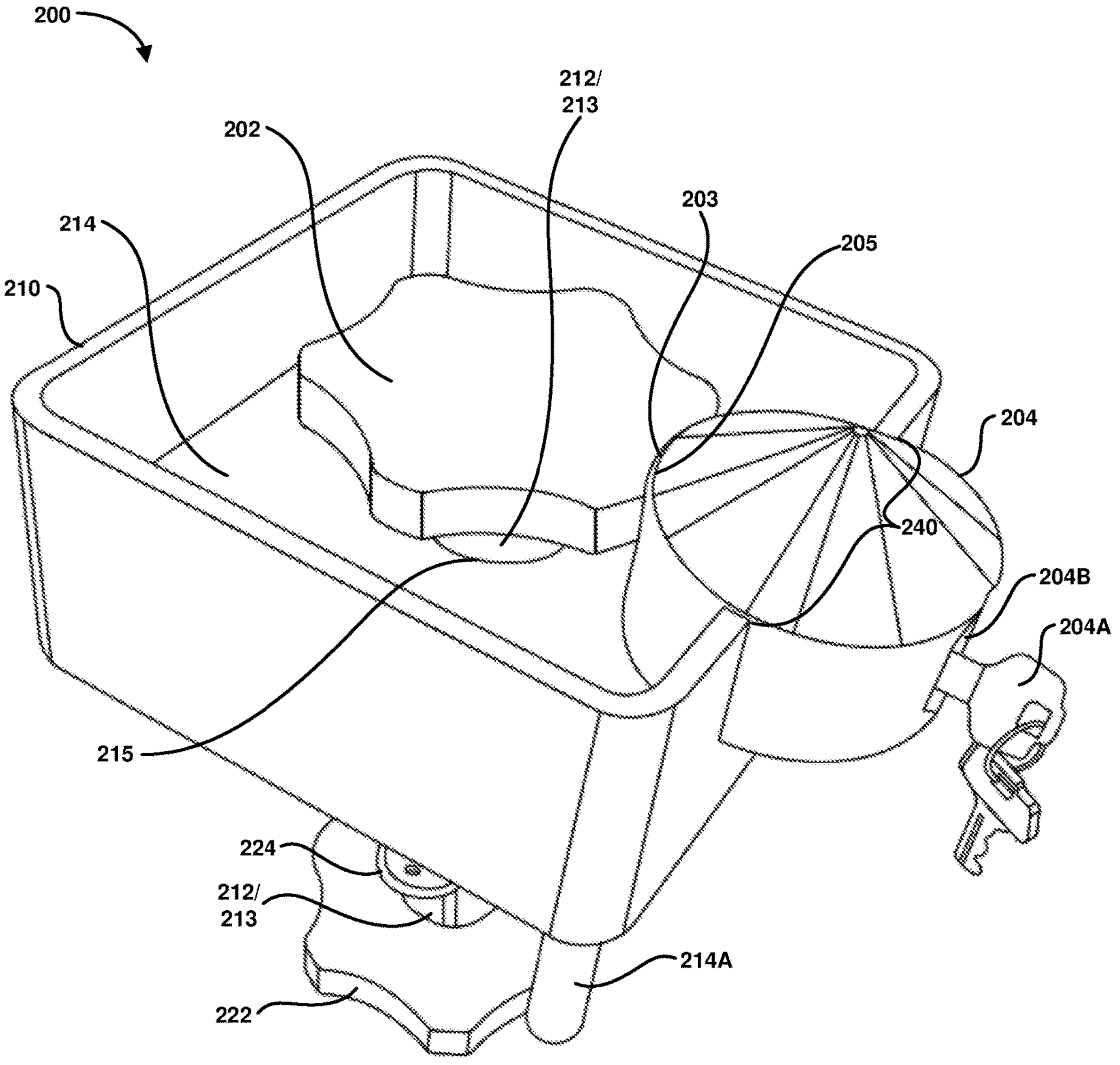
FIG. 2 is a pictorial view of a one implementation of latching mechanism for implementing embodiments of the present disclosure.

FIG. 2 is a pictorial view of a one implementation of latching mechanism 200 for implementing embodiments of the present disclosure. The latching mechanism 200 includes an outer actuator knob 202 mounted on a first end of a latch mechanism shaft 212. The latch mechanism shaft passes through a shaft opening 215 in a door and/or a latch mechanism mount plate 214 to one or more latch mechanism couplings 224 on an opposite side of the door and/or the latch mechanism mount plate 214. The latch mechanism couplings can be coupled to various types of latch bolts and actuators, as described in more detail in FIGS. 8A and 8B. in at least one implementation, the latch mechanism shaft passes through the shaft opening in a substantially perpendicular angle to the latch mechanism mount plate. The latch mechanism mount plate can include one or more mounts 214A for securing the latch mechanism mount plate to a door or gate to be latched.

In operation, rotating the outer actuator knob 202 rotates the latch mechanism shaft 212 and the one or more latch mechanism couplings 224 which, in turn, push or pull corresponding one or more various types of latch bolts and actuators.

The latching mechanism 200 includes features to selectively control or limit the operation of the latching mechanism, e.g., one or more locking features. The locking features include a removable lock 204 that can be secured to the door and/or the latch mechanism mount plate 214. The removable lock includes a locking mechanism including a key 204A and a keyway 204B and internal locking components that allow the key to selectively lock and unlock the removable lock. The removable lock can be secured to the door and/or the latch mechanism mount plate in a locked configuration and, conversely, can be released from the door and/or the latch mechanism mount plate in an unlocked configuration.

The removable lock also includes a lock body engagement surface 205 and the outer actuator knob 202 includes one or more knob engagement surfaces 203. The lock body engagement surface and the knob engagement surface(s) have corresponding, interlocking shapes. The outer actuator knob 202 cannot be rotated when the corresponding shapes are aligned and the removable lock 204 is secured to the door and/or the latch mechanism mount plate 214.

The removable lock 204 can be in several different shapes, as shown in several different implementations. By way of example, the removable lock can be a round, puck-type lock, or a more rectangular shaped lock. It should be understood, these are typical lock shapes readily available in the marketplace and the specific shape and dimensions of the removable lock is only important to form the shape and size of the outer actuator knob 202 in corresponding shape and size to the removable lock.

Another locking feature included in at least one implementation includes a shroud 210. The shroud performs multiple functions. In one or more implementations, the shroud can be made of any suitable, sturdy, durable materials, such as steel, iron, stainless steel, aluminum or other suitable metal and metal alloys. The shroud substantially surrounds at least portions of the outer actuator knob 202. In one or more implementations, the shroud has an inner width between about 20 mm and about 80 mm greater than a diameter of the outer actuator knob 80. The relatively small space between the outer actuator knob and the shroud makes more tampering with the outer actuator knob significantly more difficult. In one or more implementations, the shroud 210 protects the outer actuator knob from brute force physical attacks with gripping tools such as pliers, wrenches, pipe wrenches and similar tools for gripping and applying torque to rotate the outer actuator knob with great force. The shroud 210 protects the outer actuator knob from brute force physical attacks with a hammer or prying tools.

In one or more implementations, the shroud 210 can also protect the removable lock 204 from similar brute force attacks with hammers, prying tools or gripping tools. The shroud can also support the removable lock, preventing the removable lock from rotating with the outer actuator knob 202. By way of example, as shown in FIG. 2, the shroud 210 includes a lock opening 240 that is only slightly (e.g., less than about 5 mm) wider than the removable lock, thus limiting the side to side movement of the removable lock. In one or more implementations, the latching mechanism can be made of any suitable, sturdy, durable materials, such as steel, iron, stainless steel, aluminum or other suitable metal and metal alloys.

Figure 3A:
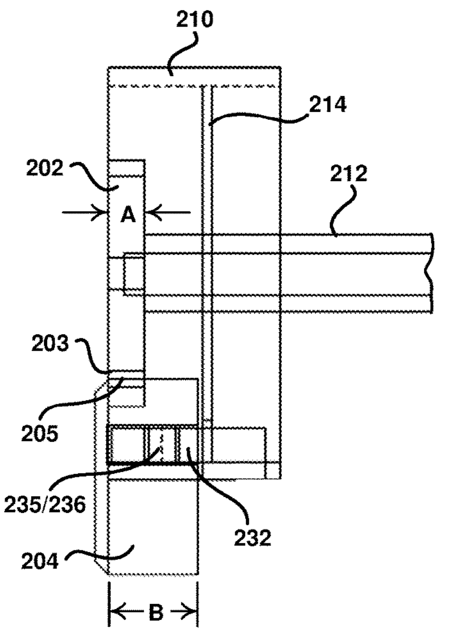
FIGS. 3A and 3B are side schematic views of the latching mechanism, for implementing embodiments of the present disclosure.
Figure 3B:
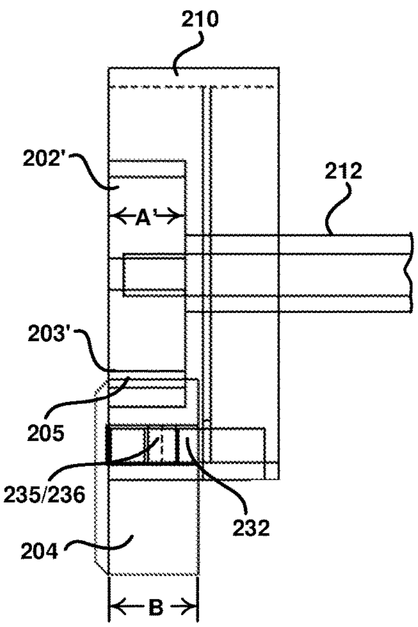

FIGS. 3A and 3B are side schematic views of the latching mechanism 200, for implementing embodiments of the present disclosure. In at least one implementation, the latching mechanism 200 includes a metal loop 232 that is mechanically bonded to the door and/or latch mechanism mount plate 214. By way of example, the metal loop can be mechanically bonded to the door and/or latch mechanism mount plate with fasteners such as rivets or bolts or similar fasteners. In another exemplary implementation, the metal loop can be mechanically bonded to the door and/or latch mechanism mount plate by welding or casting processes. In one implementation, the metal loop can be a portion of the shroud 210 that has been cast or machined or otherwise formed in the shroud. In at least one implementation, the hole in metal loop could be one or more notches such that the shackle may only grip a portion of the hole or notch metal loop and not pass all the way through the metal loop. In at least one implementation, the metal loop can be a round or rectangular post. In at least one implementation, the metal loop can pass through from the opposite side of the latch mechanism mount plate 214 and have a wider portion that prevents the metal loop from passing all the way through the latch mechanism mount plate. The metal loop can be made from any suitable metals such as steel, iron, stainless steel, bronze, nickel, aluminum, etc. and alloys containing one or more metals. The metal loop can be cast, stamped, forged, welded, bonded, fastened together with mechanical fasteners and combinations thereof.

The removable lock 204 can include a shackle cavity 230 that aligns with the metal loop 232, when the removable lock is positioned with the lock body engagement surface proximate to the at least one knob engagement surface on the outer actuator knob. The metal loop 232 includes a shackle opening 235 to allow a shackle 236 of the removable lock to pass through the metal loop in the locked configuration of the removable lock 204, thus preventing the removable lock from being removed from the latching mechanism 200, when the shackle passes through the shackle opening.

In FIG. 3A, the outer actuator knob 202 has an engagement surface thickness A. The removable lock 204 has a lock body thickness B that, in some implementations, can be substantially greater than engagement surface thickness A. By way of example, in at least one implementation, the engagement surface thickness A can be between about 5 mm and about 15 mm and lock body thickness B can be between about 20 mm and about 40 mm.

FIG. 3B illustrates an alternative outer actuator knob 202' having an alternative engagement surface thickness A' that is substantially thicker than engagement surface thickness A. By way of example, the alternative engagement surface thickness A' can be between about 15 mm and about 40 mm. The thicker, alternative engagement surface thickness A' provides more contact between an alternative knob engagement surface 203' and the lock body engagement surface 205. The thicker, alternative engagement surface thickness A' provides a stronger, thicker, alternative outer actuator knob 202' that is even more resistant to damage by brute force.

Figure 4A:
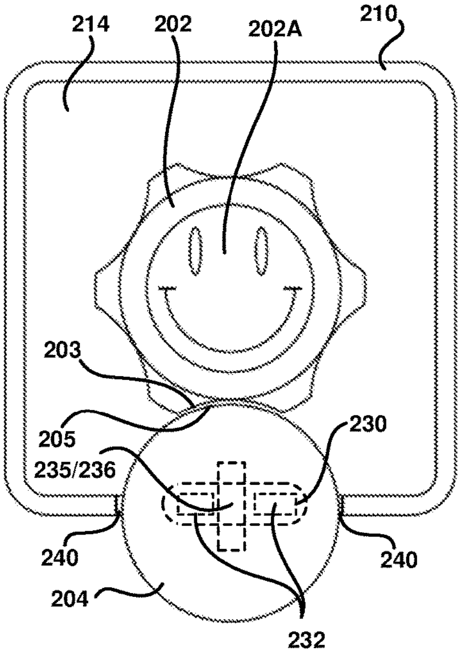
FIGS. 4A and 4B are front schematic views of the latching mechanism, for implementing embodiments of the present disclosure.
Figure 4B:
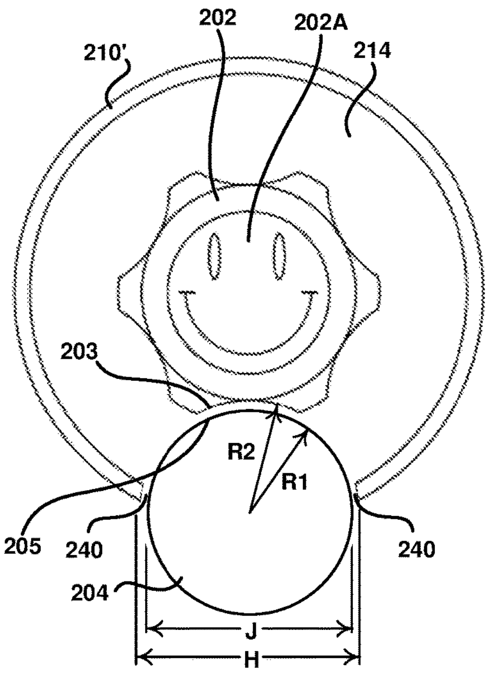
Figure 4C:
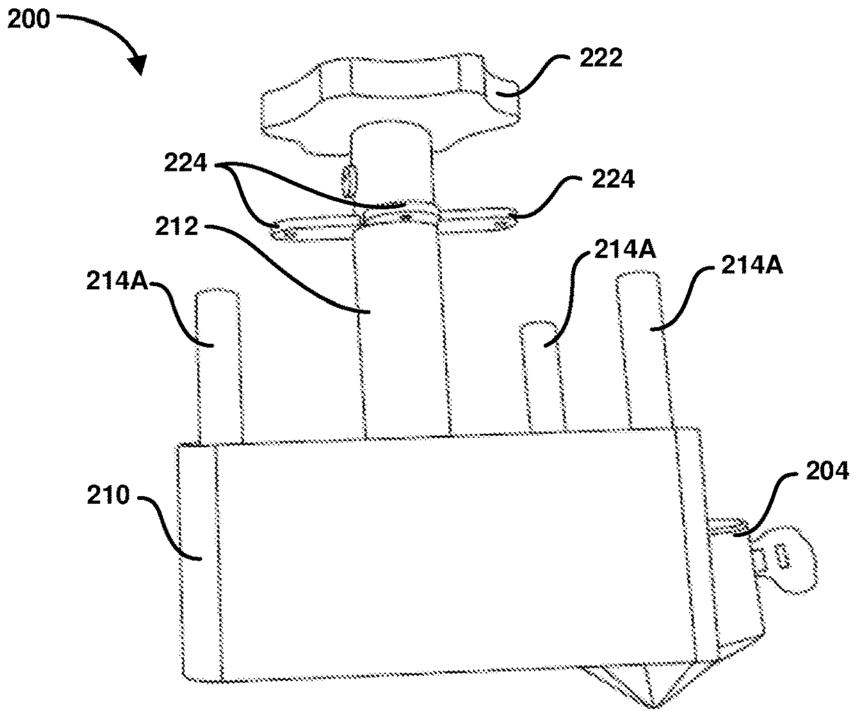
FIGS. 4C, 4D, 4E and 4F are pictorial views of the latching mechanism, for implementing embodiments of the present disclosure.
Figure 4D:
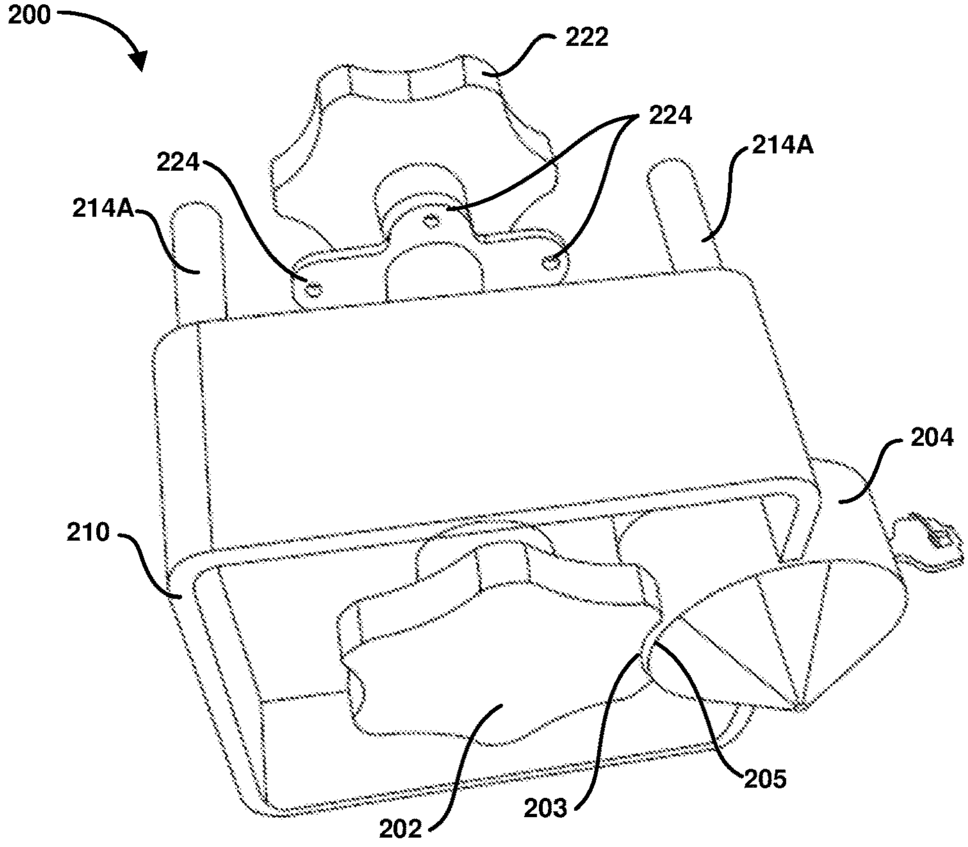
Figure 4E:
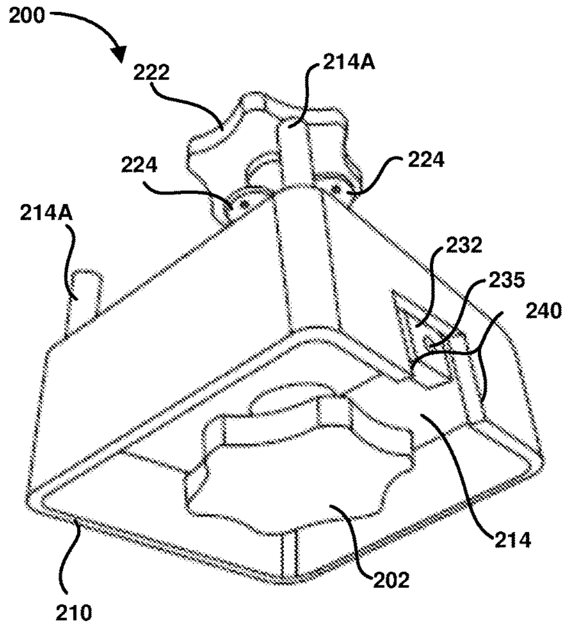
Figure 4F:
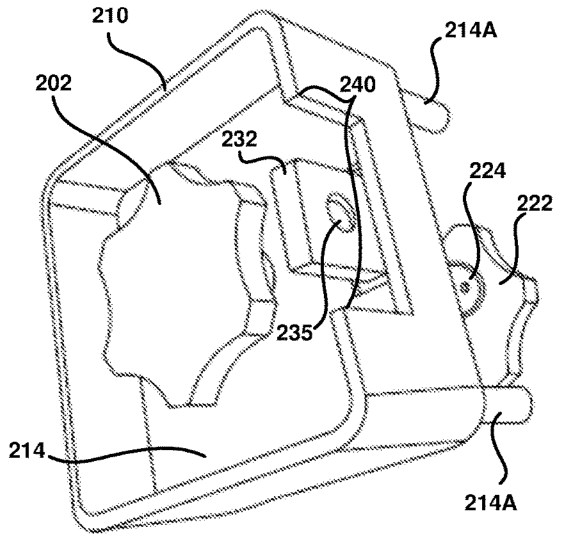
Figure 4G:
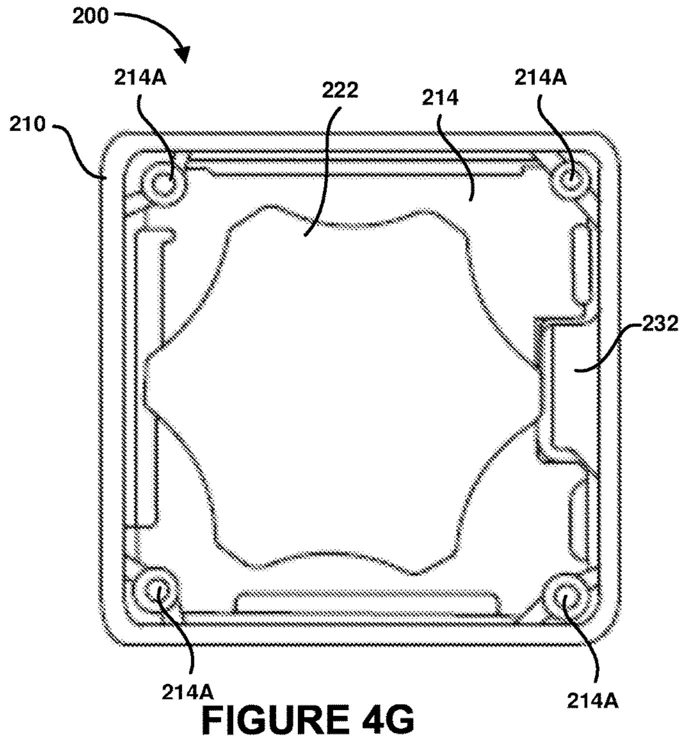
FIG. 4G is a straight on schematic view of the inner actuator knob side of the latching mechanism, for implementing embodiments of the present disclosure.
Figure 4H:
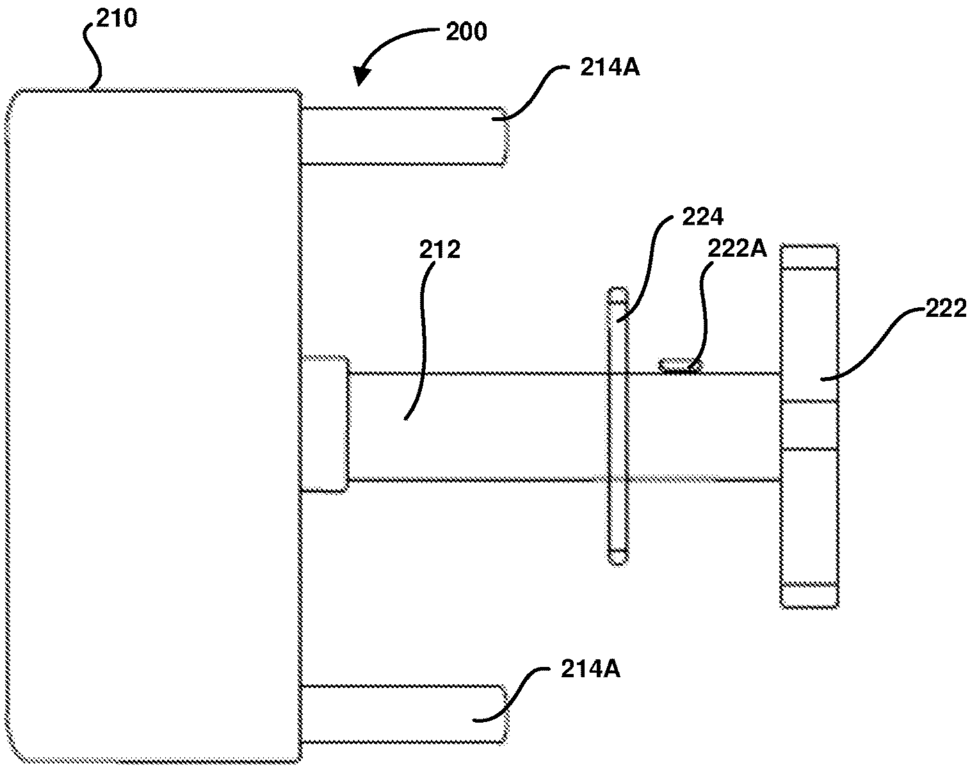
FIGS. 4H and 4I are side schematic views of the latching mechanism, for implementing embodiments of the present disclosure.
Figure 4I:
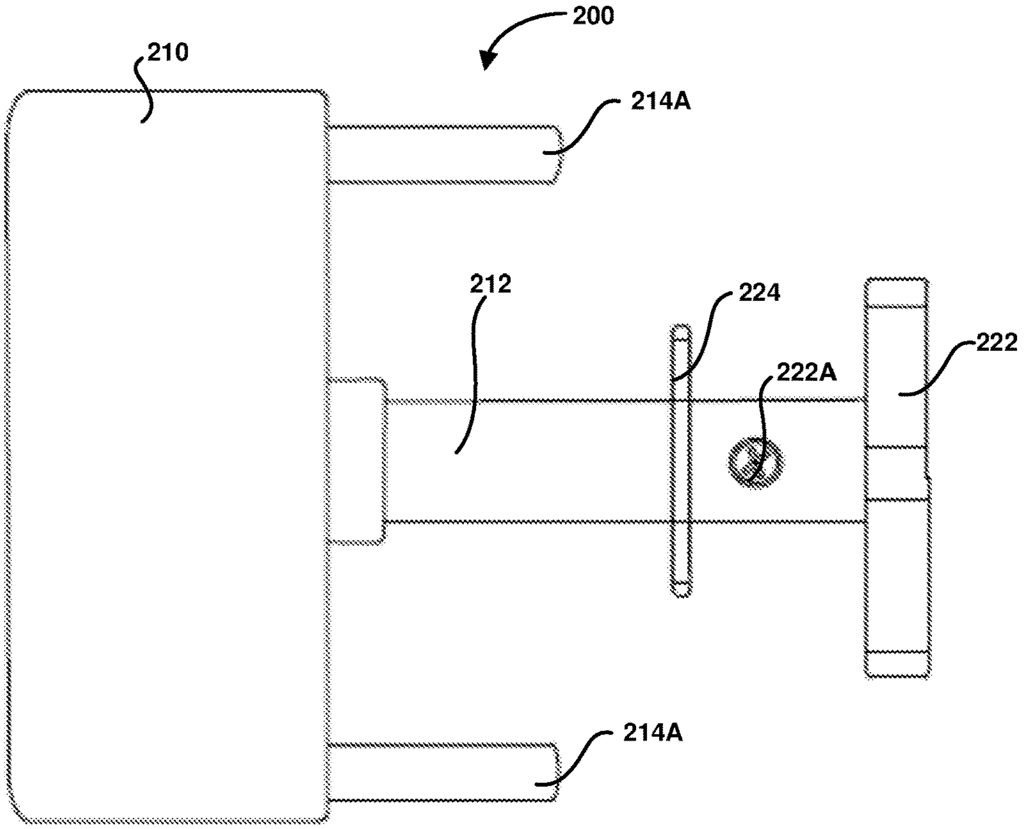

FIGS. 4A and 4B are front schematic views of the latching mechanism 200, for implementing embodiments of the present disclosure. FIGS. 4C, 4D, 4E and 4F are pictorial views of the latching mechanism 200, for implementing embodiments of the present disclosure. FIG. 4G is a straight on view of the inner actuator knob side of the latching mechanism 200, for implementing embodiments of the present disclosure. FIGS. 4H and 4I are side views of the latching mechanism 200, for implementing embodiments of the present disclosure. The outer actuating knob 202 and include an optional, decorative feature 202A, in at east one implementation. The metal loop 232 is shown as a portion of the shroud 210 that has been cast or machined or otherwise formed in the shroud 210 to include the shackle opening 235 for the shackle 236 to pass through, when the removable lock is in the locked configuration.

FIG. 4B illustrates an alternative shroud 210' having a substantially rounded shape as compared to the substantially rectangular shaped shroud 210 illustrated in other implementations. It should be understood that the shroud can be in any suitable shape. The lock opening 240 is shown having a lock opening width H that is only slightly wider than a lock width J. By way of example, the lock opening width H is between about 0.2 mm and about 10 mm wider than the lock width J.

FIG. 4B also illustrates an example relationship of the shapes of the knob engagement surface 203 and the lock engagement surface 205. The knob engagement surface and the lock engagement surface are curved. More specifically, the knob engagement surface has a concave curved shape and the lock engagement surface has a convex curved shape. The knob engagement surface and the lock engagement surface have very similar radii so as to maximize the engagement between the knob engagement surface and the lock engagement surface. By way of example, the lock engagement surface has a radius of R1 and the knob engagement surface has a radius R2, where radius R2 is between about 0.2 mm and about 5 mm greater than radius R1, however, the radius R2 is sufficiently limited to prevent the outer actuator knob 202 from rotating, when the removable lock is in the locked configuration. In a more rectangular shaped removable lock, the dimensions of the removable lock and the knob engagement surface 203 are formed to substantially minimize any space between the lock engagement surface 205 and the knob engagement surface.

The optional inner actuator knob 222 is shown in the figures. The optional inner actuator knob is coupled to the latch mechanism shaft 212 on an opposite end from the outer actuator knob 202. The optional inner actuator knob can be secured to the latch mechanism shaft via welding or other suitable mechanical means such as an inner actuator knob bolt 222A.

Multiple latch mechanism couplings 224 are shown mechanically coupled to the latch mechanism shaft 212. The latch mechanism couplings can include one or more latch mechanism couplings. The latch mechanism couplings link the latch mechanism shaft to one or more latching bolts so that a rotation of the latch mechanism shaft causes the one or more latching bolts to selectively extend or retract, as will be described in more detail below.

Figure 4J:
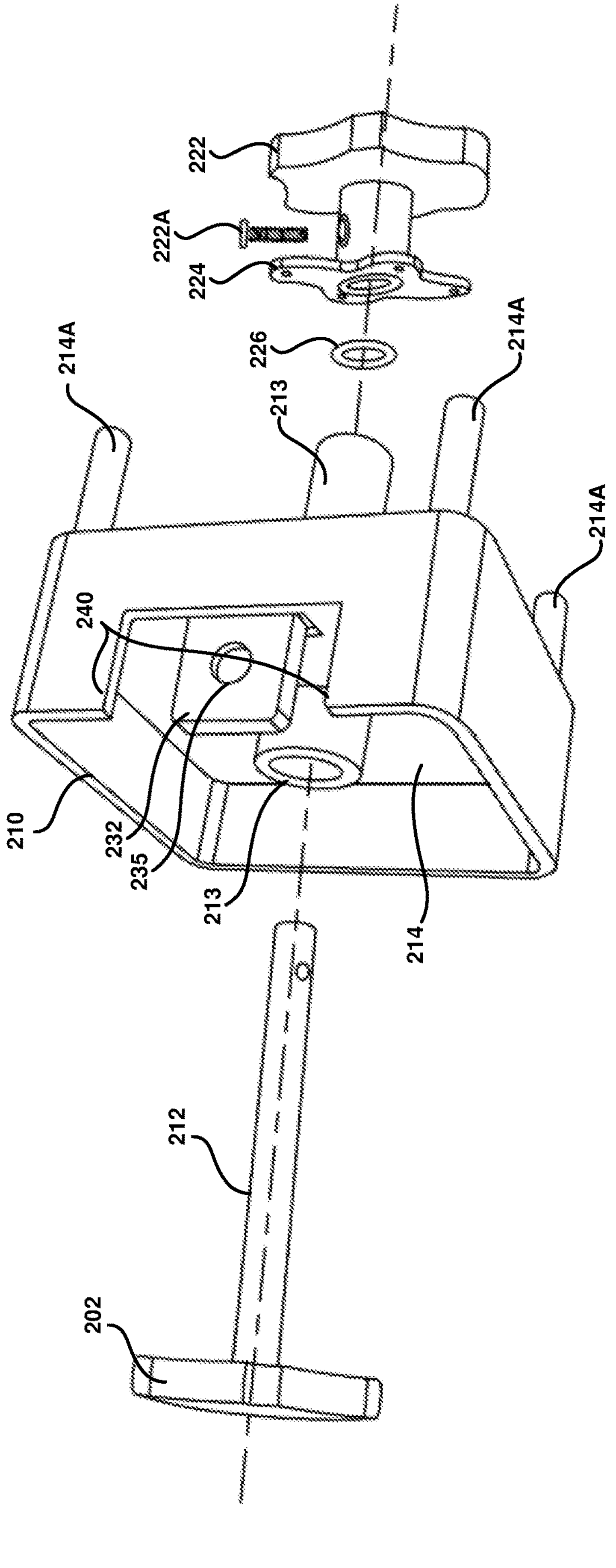
FIG. 4J is an exploded schematic view of the latching mechanism, for implementing embodiments of the present disclosure.

FIG. 4J is an exploded schematic view of the latching mechanism 200, for implementing embodiments of the present disclosure. The latching mechanism includes the outer actuator knob 202 mounted on the latch mechanism shaft 212. The latch mechanism shaft passes through a latch mechanism shaft support 213 which, in turn, passes through the latch mechanism mount plate 214 and provides corresponding spacing between the outer actuator knob and the latch mechanism mount plate. The inner actuator knob 222 can be formed with the latch mechanism coupling 224, as shown. The inner actuator knob and latch mechanism coupling sub-assembly can be fitted over the inner end of the latch mechanism shaft 212. A latch mechanism coupling washer 226 isolates the rotation of the inner actuator knob and latch mechanism coupling sub-assembly from the inner end of the latch mechanism shaft support 213. The inner actuator knob bolt 222A secures the inner actuator knob and latch mechanism coupling sub-assembly to the latch mechanism shaft 212.

Figure 4K:
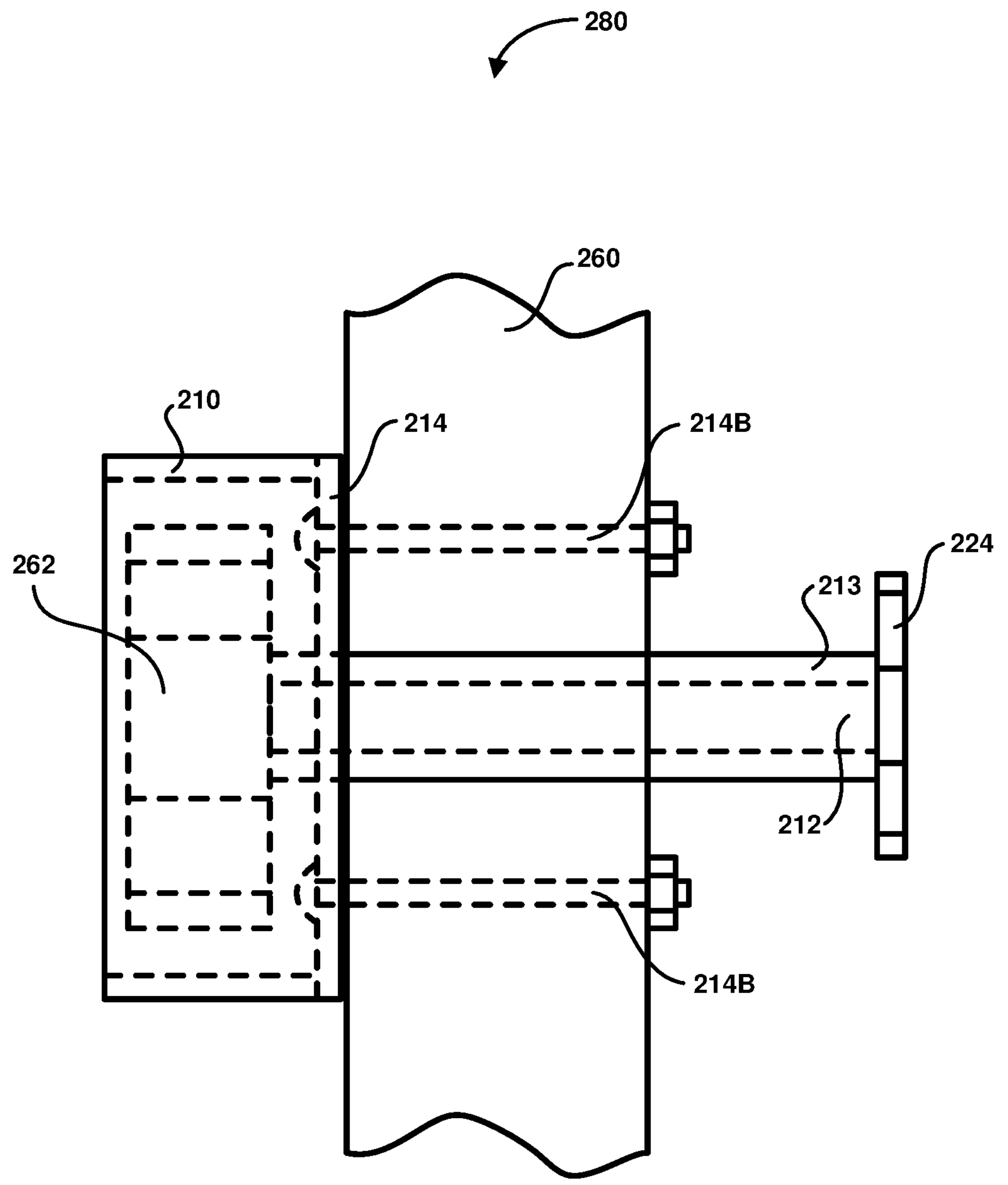
FIG. 4K is a schematic view of the latching mechanism, for implementing embodiments of the present disclosure.

FIG. 4K is a schematic view of a latching mechanism 280, for implementing embodiments of the present disclosure. The latching mechanism includes a thicker outer actuator knob 262 mounted on the latch mechanism shaft 212. The latch mechanism shaft passes through a latch mechanism shaft support 213 which, in turn, passes through the latch mechanism mount plate 214 and provides corresponding spacing between the outer actuator knob and the latch mechanism mount plate. The latch mechanism coupling 224 is shown on the inner end of the latch mechanism shaft 212, opposite from the outer actuator knob 262. The latching mechanism 280 is mounted on a door 260 with one or more bolts 214B without need of the mounts 214A, described above. The shroud 210 is closer to the outer actuator knob 262 than described above. The smaller gap between the shroud and the outer actuator knob makes the latching mechanism more tamper resistant as it is more difficult for a tool to access the outer actuator knob. The thicker outer actuator knob 262 is also stronger and therefore more tamper resistant. The thicker outer actuator knob also has a smaller gap between the outer actuator knob and the latch mechanism mount plate and therefore is even more tamper resistant.

Figure 5A:
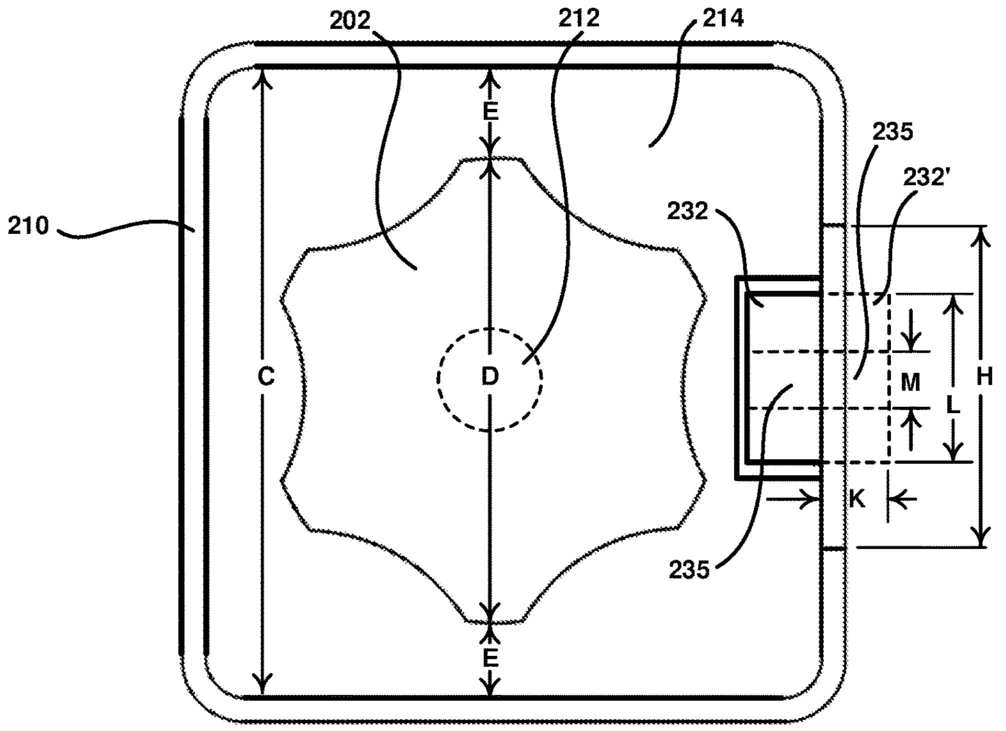
FIG. 5A is an inline schematic view of the latching mechanism, for implementing embodiments of the present disclosure.
Figure 5B:
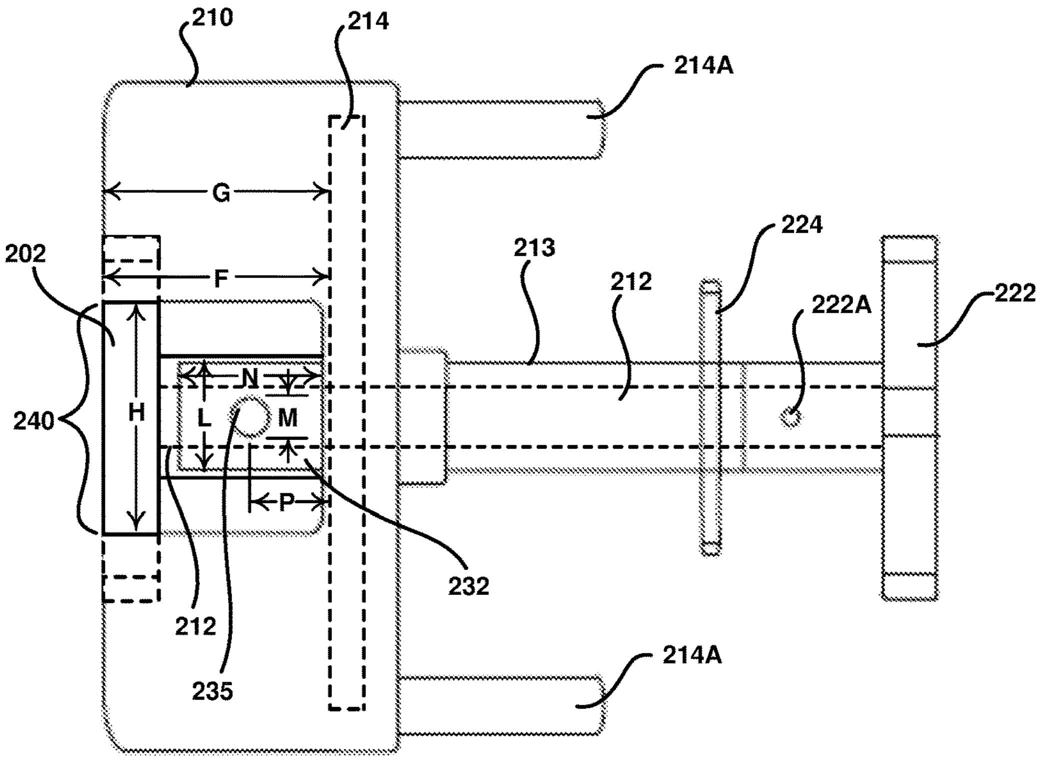
FIG. 5B is a side schematic view of the latching mechanism, for implementing embodiments of the present disclosure.

FIG. 5A is an inline schematic view of the latching mechanism 200, for implementing embodiments of the present disclosure. FIG. 5B is a side schematic view of the latching mechanism 200, for implementing embodiments of the present disclosure. The shroud 210 has a shroud width C and shroud height G. The outer actuator knob 202 has an outer actuator knob width D and an outer knob height F. The outer actuator knob height can be less than, equal to, or greater than the shroud height. Preferably, the outer actuator knob height is less than or equal to the shroud height as this relationship between the shroud height and the outer actuator knob height limits access to the outer actuator knob by external, brute force application tools such as prying tools, large wrenches (e.g., large pliers or a pipe wrench) or blunt force instruments such as a hammer. In at least one implantation, the outer actuator knob height is equal to the shroud height. In another implantation, the actuator knob height is less than the shroud height.

The outer actuator knob width D leaves an outer actuator knob access width E on either side of the outer actuator knob. The outer actuator knob access width E is minimized to limit access to the outer actuator knob by external, brute force application tools such as prying tools, large wrenches (e.g., large pliers or a pipe wrench) or blunt force instruments such as a hammer. The outer actuator knob access width E has a minimum dimension of about 15 mm to provide sufficient access for a user to grip the outer actuator knob 202. The outer actuator knob access width has a maximum dimension limited by the desired durability and resistance to the external, brute force application tools.

The shroud 210 also has a lock opening width H sufficient to allow the selected removable lock 204 (not shown) to fit within the lock opening 240. The lock opening width is between about 0.2 mm and about 10 mm wider than a width of the removable lock. In at least one implementation, the metal loop 232 is substantially centered in the lock opening. Alternatively, the metal loop could be off-center from the lock opening. In at least one implementation, the metal loop 232 is in line with the shroud 210, as shown in FIG. 4A. Alternatively, the metal loop can be offset from the shroud to be closer to the outer actuator knob 202, as shown in FIG. 5A. Alternatively, the metal loop 232' (shown in phantom) can be offset from the shroud to be further away from the outer actuator knob 202. The metal loop has a metal loop width L, a metal loop height N, a shackle height P and a metal loop thickness K and a shackle opening width M. The chosen location, offset, width, height, the shackle opening height and the shackle opening width of the metal loop correspond to the shackle cavity 230 and shackle size of the selected removable lock.

Figure 5C:
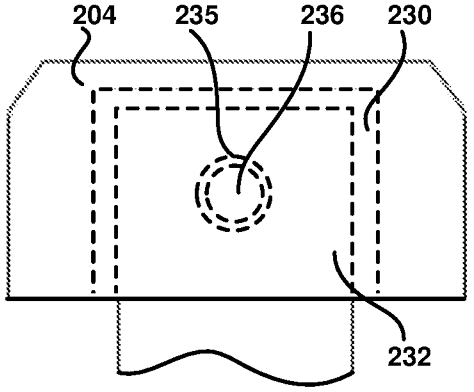
FIG. 5C is a side schematic view of a removable lock, for implementing embodiments of the present disclosure.

FIG. 5C is a side schematic view of a removable lock 204, for implementing embodiments of the present disclosure. The removable lock 204 includes the shackle cavity 230 which encloses a portion of the metal loop 232. The removable lock also includes a shackle 236 that is aligned with the shackle opening 235 in the metal loop.

Figure 6A:
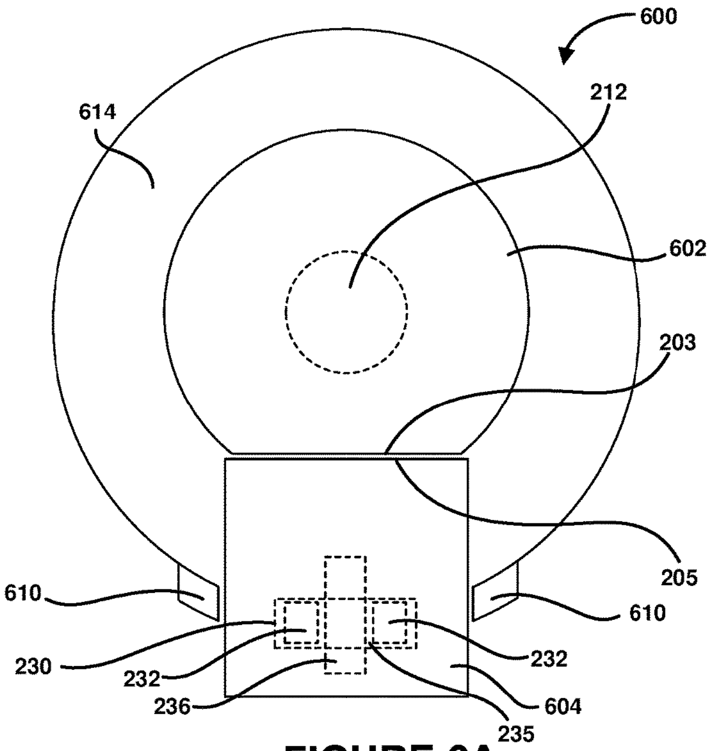
FIG. 6A is an inline schematic view of an alternative latching mechanism, for implementing embodiments of the present disclosure.

FIG. 6A is an inline schematic view of an alternative latching mechanism 600, for implementing embodiments of the present disclosure. The alternative latching mechanism 600 includes a segmented shroud 610 that only surrounds portions of a rounded outer actuator knob 602. The rounded outer actuator knob 602 has a flat knob engagement surface 203 to correspond to a flat lock body engagement surface 205 of the removable lock 604. The segmented shroud 610 is formed on both sides of the removable lock 604 to form a lock opening 240, as described elsewhere herein.

Figure 6B:
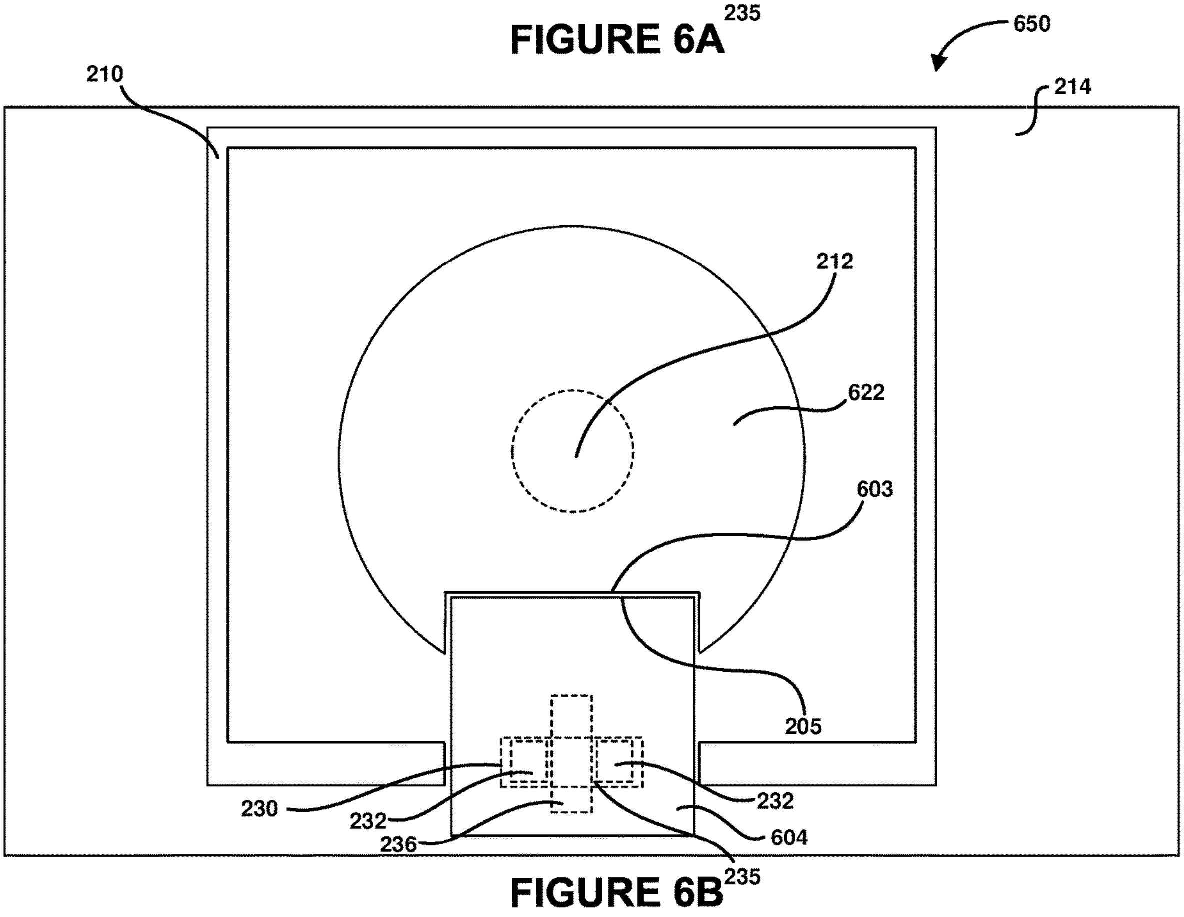
FIG. 6B is an inline schematic view of an alternative latching mechanism, for implementing embodiments of the present disclosure.
Figure 7A:
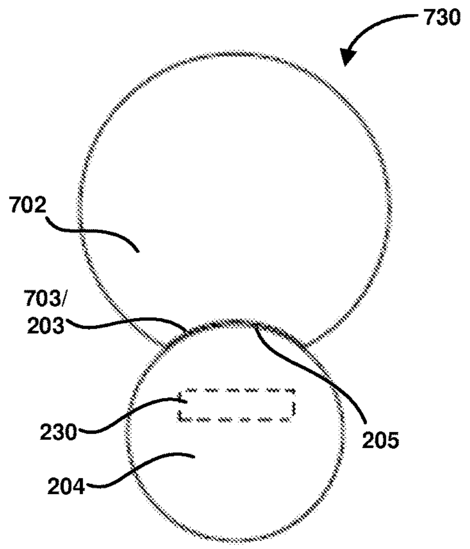
FIGS. 7A-7F are inline schematic views of alternative latching mechanisms, for implementing embodiments of the present disclosure.
Figure 7B:
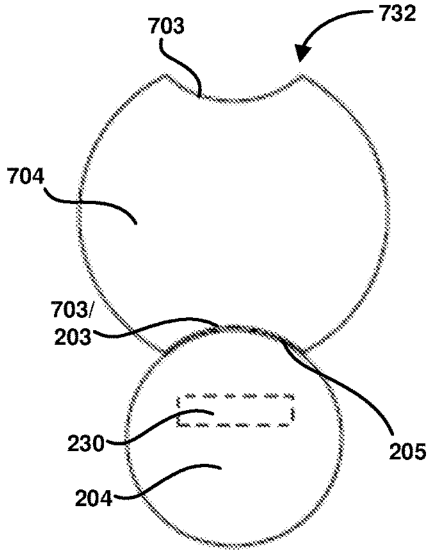
Figure 7C:
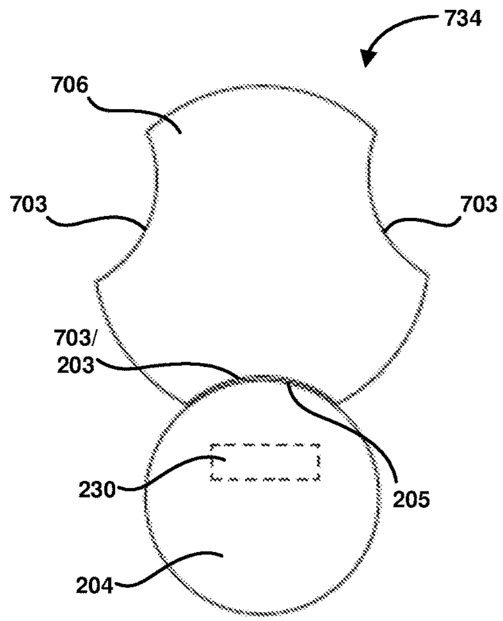
Figure 7D:
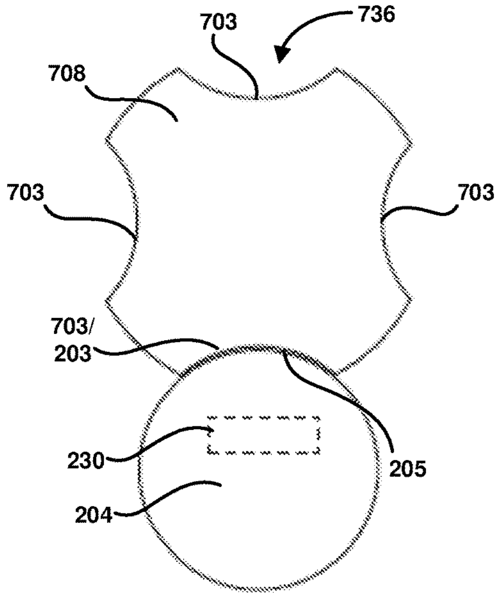
Figure 7E:
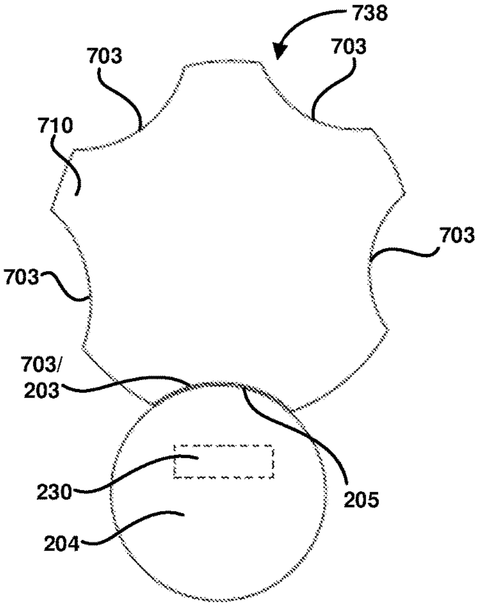
Figure 7F:
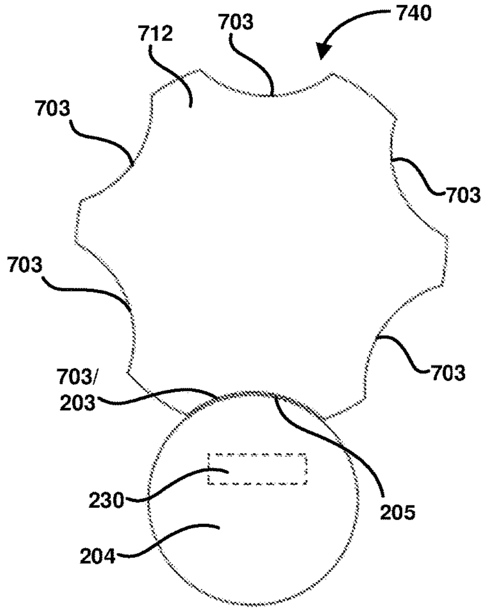

FIG. 6B is an inline schematic view of an alternative latching mechanism 650, for implementing embodiments of the present disclosure. The alternative latching mechanism 650 includes a substantially rectangular shroud 210 that surrounds a rounded outer actuator knob 622. The alternative latching mechanism 650 can optionally include a latch mechanism mount plate 214 that is significantly larger than the shroud.

The rounded outer actuator knob 622 has a 3-flat-sided, substantially rectangular, knob engagement surface 603 to correspond to a substantially flat lock body engagement surface 205 of the removable lock 604. The 3-flat-sided substantially rectangular knob engagement surface 603 is merely an exemplary shape. Other shapes including but not limited to rounded, triangular, flat, trapezoidal, polygonal, etc. outer knob engagement surfaces can be utilized with a removable lock having a corresponding lock body engagement surface. It should be understood that a removable lock can have any suitable, corresponding size and shape to correspond to the shape of the engagement surface on the outer actuator knob.

FIGS. 7A-7F are inline schematic views of alternative latching mechanisms 730-740, for implementing embodiments of the present disclosure. Alternative latching mechanism 730 includes an outer actuator knob 702 with a single, concave outer actuator knob engagement surface 703. Alternative latching mechanism 732 includes an outer actuator knob 704 with two, concave outer actuator knob engagement surfaces 703. Alternative latching mechanism 734 includes an outer actuator knob 706 with three, concave outer actuator knob engagement surfaces 703. Alternative latching mechanism 736 includes an outer actuator knob 708 with four, concave outer actuator knob engagement surfaces 703. Alternative latching mechanism 738 includes an outer actuator knob 710 with five, concave outer actuator knob engagement surfaces 703. Alternative latching mechanism 740 includes an outer actuator knob 712 with six, concave outer actuator knob engagement surfaces 703. These exemplary implementations are merely exemplary and it should be understood that the outer actuator knob can have any desired number of outer actuator knob engagement surfaces.

Figure 8:
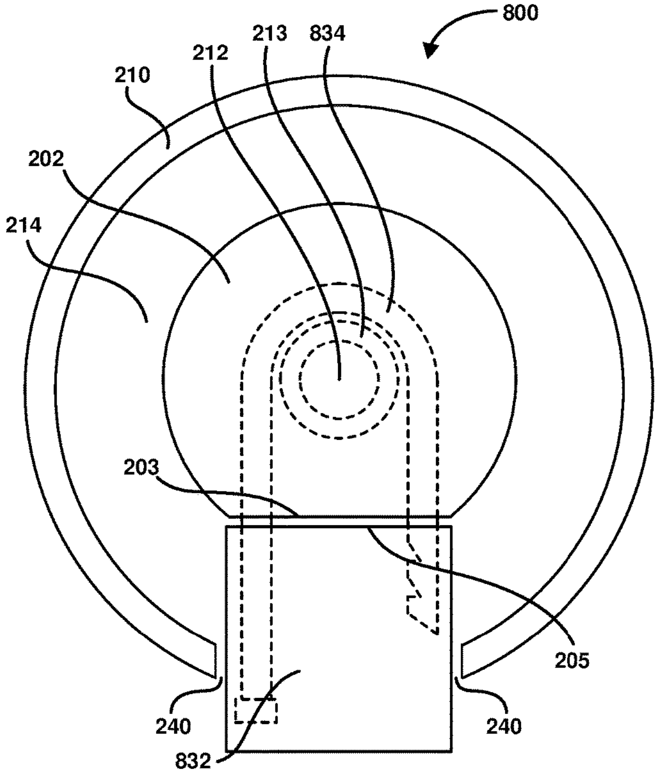
FIG. 8 is an inline schematic view of an alternative latching mechanism, for implementing embodiments of the present disclosure.

FIG. 8 is an inline schematic view of an alternative latching mechanism 800, for implementing embodiments of the present disclosure. The alternative latching mechanism 800 includes a removable lock 832 that includes a u-shaped shackle 834 capable of encompassing the latch mechanism shaft 212 and the latch mechanism shaft support 213. The u-shaped shackle 834 pulls the lock body engagement surface 205 to close proximity to the outer actuator knob engagement surface 203. The lock opening 240 in the shroud 210 limits the rotation of the removable lock 832 and thus limits the rotation of the outer actuator knob.

Figure 9A:
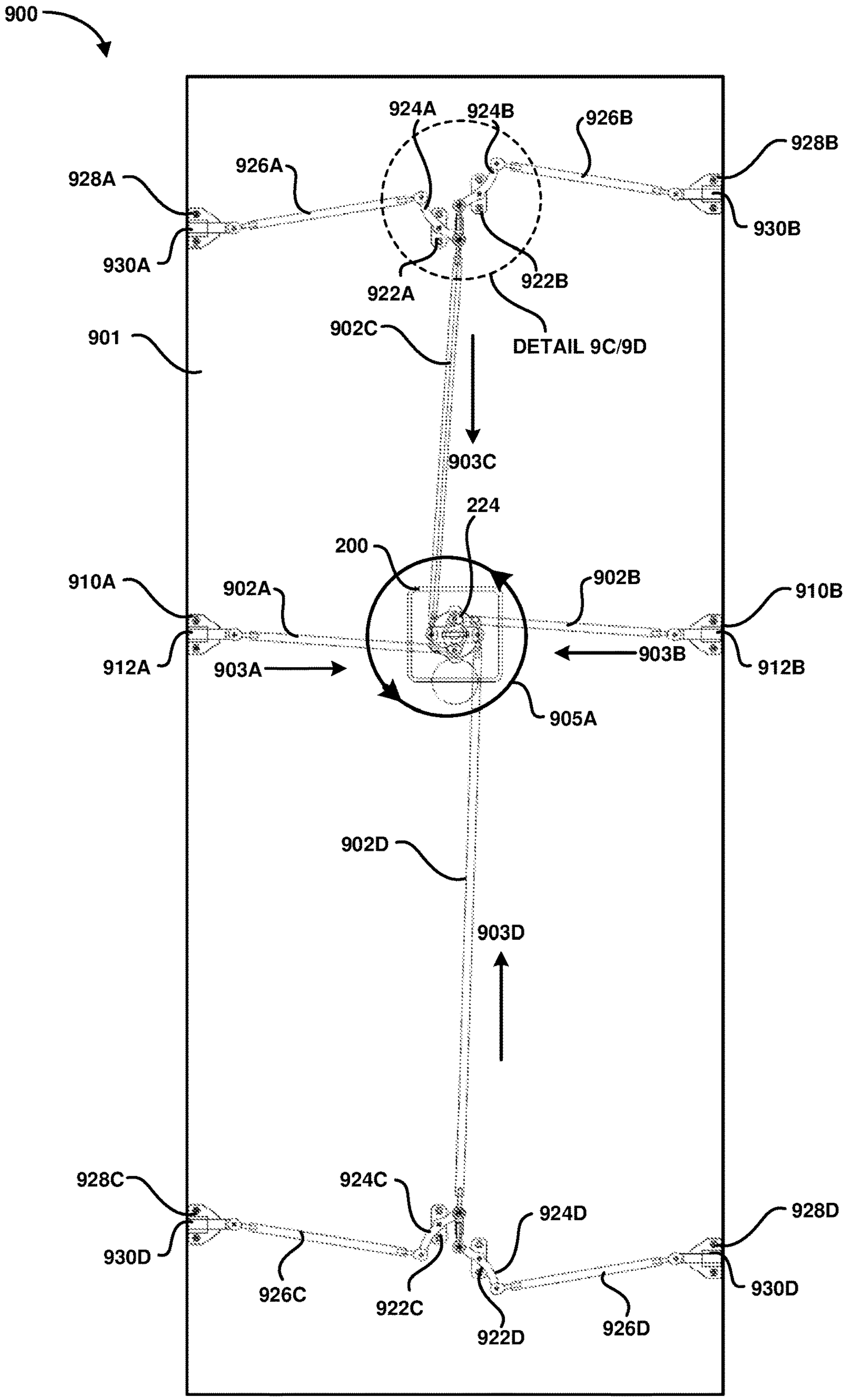
FIGS. 9A and 9B illustrate schematic views of a door latch system, for implementing embodiments of the present disclosure.
Figure 9B:
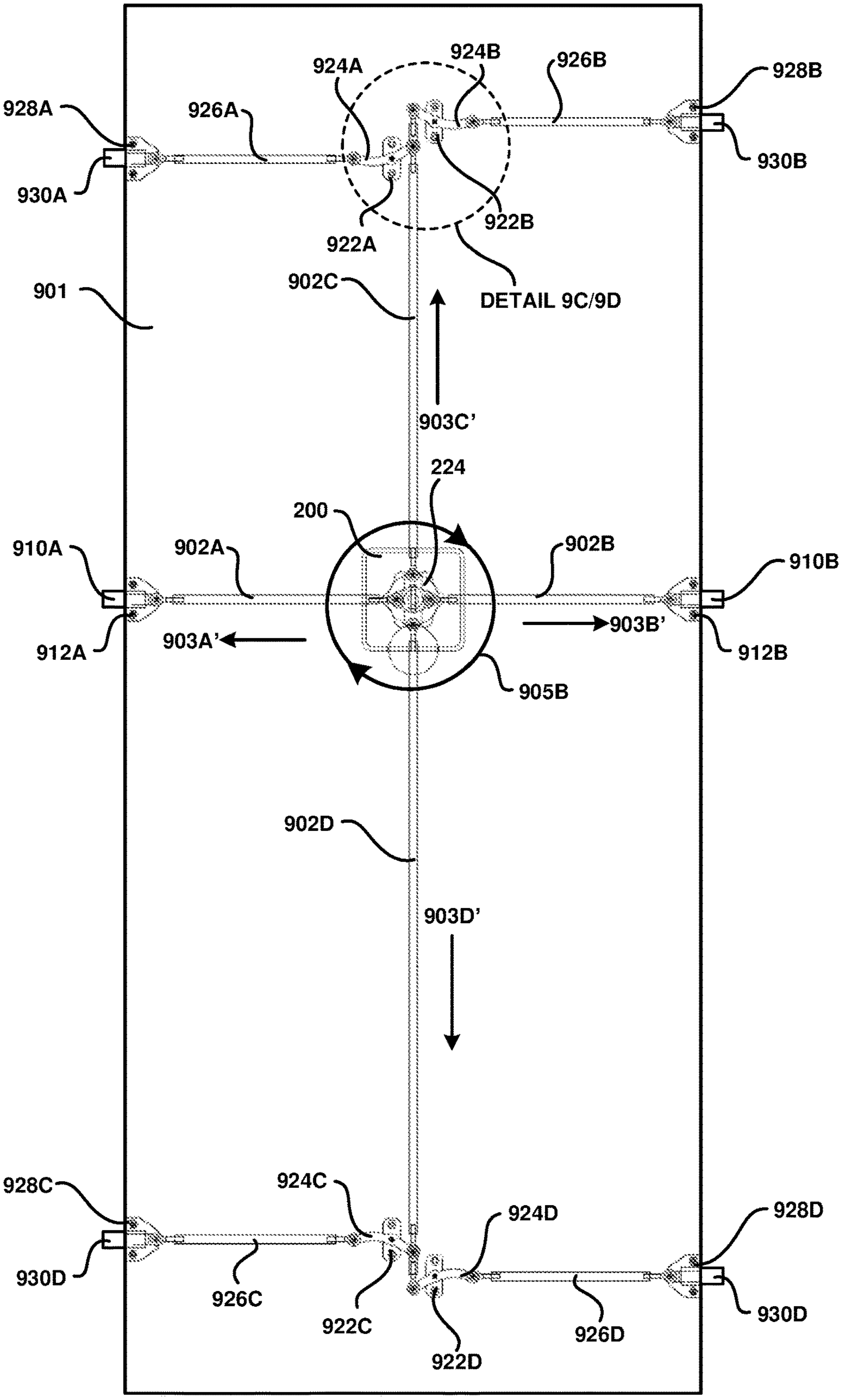

FIGS. 9A and 9B illustrate schematic views of a door latch system 900, for implementing embodiments of the present disclosure. The door latch system 900 includes an outer surface 903 of a door 901, a latching mechanism 200 is secured to the outer surface. The latching mechanism 200 can include or be similar to any one of the latching mechanisms described herein, and combinations thereof. A shaft opening passes through the latching mechanism and the door. A latch mechanism shaft passes through the shaft opening. An outer actuator knob is mounted on the outer end of the latch mechanism shaft. The outer actuator knob includes at least one engagement surface. The at least one engagement surface includes a shape corresponding to a lock body engagement surface of a lock body of a removable lock. The removable lock is capable of being secured with the lock body engagement surface proximate to the least one engagement surface. At least one latch mechanism coupling 224 is coupled to the latch mechanism shaft. The outer surface of the door is disposed between the outer actuator knob and the at least one latch mechanism coupling. One or more latch rods 902A-D are pivotally coupled between at least one sliding bolt 912A, 912B, 930A-D and the at least one latch mechanism coupling.

In an unlatching operation, rotating the outer actuator knob in a counter-clockwise direction 905A rotates the latch mechanism shaft which causes the latch mechanism coupling to correspondingly pull the latch rods 902A-D in corresponding directions 903A-D. Pulling the latch rods 902A, 902B causes the sliding bolts 912A, 912B to withdraw inward, toward the center of the door. Pulling the latch rod 902C causes the levers 924A, 924B to pivot on corresponding pivots 922A, 922B which pulls respective latch rods 926A, 926B and corresponding sliding bolts 930A, 930B to withdraw inward, toward the center of the door. Pulling the latch rod 902D causes the levers 924C, 924D to pivot on corresponding pivots 922C, 922D which pulls respective latch rods 926C, 926D and corresponding sliding bolts 930C, 930D to withdraw inward, toward the center of the door.

In a latching operation, rotating the outer actuator knob in clockwise direction 905B rotates the latch mechanism shaft which causes the latch mechanism coupling to correspondingly push the latch rods in corresponding directions 903A'-D'. Pushing the latch rods 902A, 902B causes the sliding bolts 912A, 912B to extend outward, away from the center of the door into corresponding door frame openings to securely latch the door in the door frame. Pushing the latch rod 902C causes the levers 924A, 924B to pivot on corresponding pivots 922A, 922B which pushes respective latch rods 926A, 926B and causes corresponding sliding bolts 930A, 930B to extend outward, away from the center of the door into corresponding door frame openings to securely latch the door in the door frame. Pushing the latch rod 902D causes the levers 924C, 924D to pivot on corresponding pivots 922C, 922D which pushes respective latch rods 926C, 926D and causes corresponding sliding bolts 930C, 930D to extend outward, away from the center of the door into corresponding door frame openings to securely latch the door in the door frame. While FIGS. 9A and 9B show six sliding bolts 910A, 910B, 930A, 930B, 930C and 930D, it should be understood that the door latch system can include as few as one sliding bolt or more than six sliding bolts, as may be required by the size and shape of the door being secured. It should also be understood that while the door is illustrated as a rectangular door, the door could be any desired shape such as polygonal, rectangular, rounded or other shape as may be required for the selected application.

Figure 9C:
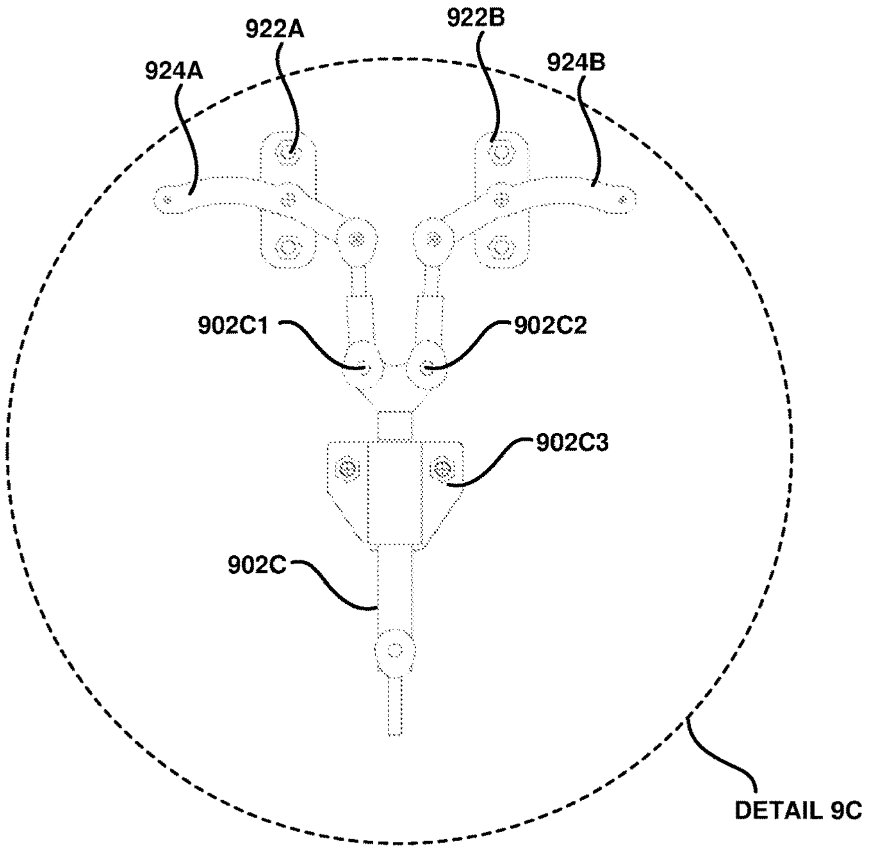
FIGS. 9C and 9D illustrate schematic views of Detail 9C/9D of FIGS. 9A and 9D, for implementing embodiments of the present disclosure.
Figure 9D:
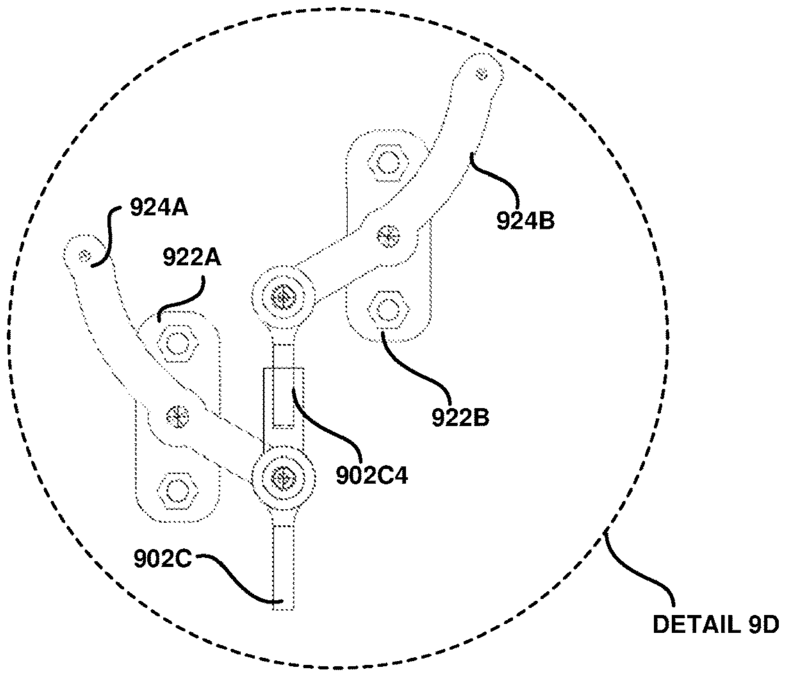

FIGS. 9C and 9D illustrate schematic views of Detail 9C/9D of FIGS. 9A and 9D, for implementing embodiments of the present disclosure. As shown in FIG. 9C, the detailed view of the dual pivot includes tandem latch rods 902C1, 902C2 to link the latch rod 902C to the levers 924A, 924B. The tandem latch rods 902C1, 902C2 have pivots on one or both ends of the tandem latch rods which provides flexible links to the levers 924A, 924B.

As shown in FIG. 9D, the detailed view of the dual pivot includes a single, linear latch rod 902C4 to link the latch rod 902C to the levers 924A, 924B. The single, linear latch rod 902C4 has pivots on one or both ends which provides a flexible link to the levers 924A, 924B. It should be understood that any suitable link system can be used to link the latch rod 902C to the levers 924A, 924B.

As described in the preceding figures above, the removable lock can secure the outer actuator knob in a locked orientation with the sliding bolts extended outward from the center of the door. The door is held within a door frame and the door frame includes a strike plate or opening aligned with the sliding bolt so that the sliding bolt extends into the strike plate in the door frame.

Figure 10:
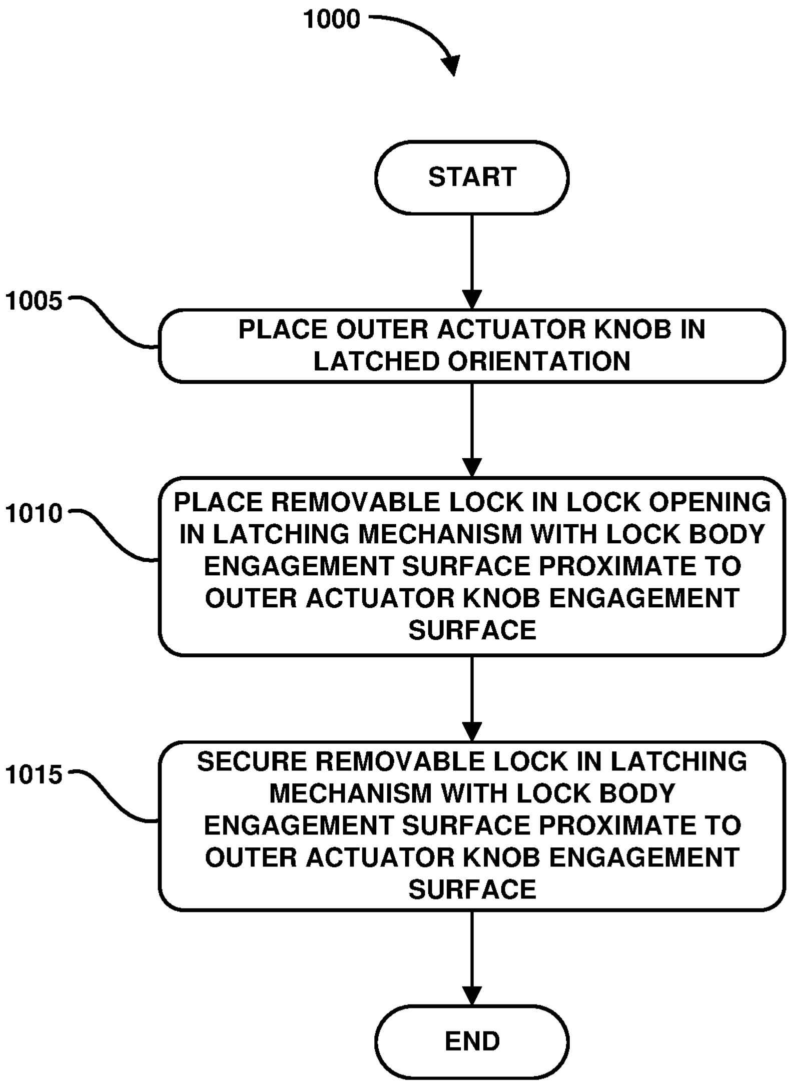
FIG. 10 is a flowchart diagram that illustrates the method operations performed in latching and locking a latching mechanism, for implementing embodiments of the present disclosure.

FIG. 10 is a flowchart diagram that illustrates the method operations 1000 performed in latching and locking a latching mechanism, for implementing embodiments of the present disclosure. The operations illustrated herein are by way of example, as it should be understood that some operations may have sub-operations and in other instances, certain operations described herein may not be included in the illustrated operations. With this in mind, the method and operations 1000 will now be described.

In an operation 1005, the outer actuator knob is placed in a latched orientation. In the latched orientation, the outer actuator knob engagement surface is aligned with a position of the removable lock. The outer actuator knob latched orientation can also cause the sliding bolt(s) to extend into a latched orientation.

In an operation 1010, the removable lock is placed into the lock opening in the latching mechanism with the lock body engagement surface proximate to the outer actuator knob engagement surface.

In an operation 1015, the removable lock is secured in the latching mechanism with the lock body engagement surface proximate to the outer actuator knob engagement surface and the method operations can end.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A latching mechanism comprising:

a latch mechanism shaft;

a rotatable outer actuator knob including at least one outer actuator knob engagement surface, the at least one outer actuator knob engagement surface having a shape corresponding to a lock body engagement surface of a lock body of a removable lock, wherein the outer actuator knob is mounted on the latch mechanism shaft, proximate to a first end of the latch mechanism shaft, the outer actuator knob being capable of rotating the latch mechanism shaft, wherein the removable lock is capable of being secured in a locked position with the lock body engagement surface proximate to the at least one outer actuator knob engagement surface; and a latch mechanism mount plate including a shaft opening, wherein the latch mechanism shaft passes through the shaft opening, wherein the lock body engagement surface has a convex shape having a first radius and wherein the at least one outer actuator knob engagement surface has a concave shape having a second radius substantially equal to the first radius, wherein a lock body of the removable lock includes:

a first side, the first side including a shackle cavity;

a straight shackle passing through the shackle cavity; and wherein the latch mechanism mount plate includes a metal loop positioned to align with the shackle cavity when the removable lock is positioned with the lock body engagement surface proximate to the at least one outer actuator knob engagement surface.

2. The latching mechanism of claim 1, wherein the at least one outer actuator knob engagement surface is formed in an outer perimeter of the outer actuator knob.

3. The latching mechanism of claim 1, further comprising a shroud coupled to the latch mechanism mount plate, wherein the shroud is disposed surrounding at least two portions of the outer perimeter of the outer actuator knob, the shroud having a shroud width greater than an outer actuator knob width.

4. The latching mechanism of claim 3, wherein the outer actuator knob is disposed on the latch mechanism shaft such that an outer surface of the outer actuator knob is an outer actuator knob height relative to the latch mechanism mount plate, and wherein the shroud includes a shroud height relative to the latch mechanism mount plate wherein the shroud height is equal to or greater than the outer actuator knob height, the shroud including a lock opening, the lock opening having a lock opening width between 0.2 mm and 10 mm greater than a width of the removable lock.

5. The latching mechanism of claim 3, wherein the shroud has a substantially round shape.

6. The latching mechanism of claim 3, wherein the shroud has a substantially rectangular shape.

7. The latching mechanism of claim 3, wherein the shroud has an inner width of between 20 mm and 80 mm greater than a diameter of the outer actuator knob.

8. The latching mechanism of claim 1, further comprising at least one latch mechanism coupling coupled to the latch mechanism shaft, wherein the latch mechanism mount plate is disposed between the outer actuator knob and the at least one latch mechanism coupling.

9. The latching mechanism of claim 1, wherein the second radius is not more than 5 mm greater than the first radius.

10. The latching mechanism of claim 1, further comprising an inner actuator knob mounted on the latch mechanism shaft proximate to a second end of the latch mechanism shaft, the second end of the latch mechanism shaft being opposite from the first end of the latch mechanism shaft.

11. The latching mechanism of claim 1, wherein the latch mechanism mount plate is a portion of a surface of a door.

12. The latching mechanism of claim 1, wherein the at least one outer actuator knob engagement surface includes an engagement surface thickness between 5 mm and 40 mm.

13. A latching mechanism comprising:
- a latch mechanism mount plate including a shaft opening;
- a latch mechanism shaft, wherein the latch mechanism shaft passes through the shaft opening;
- an outer actuator knob including at least one concave outer actuator knob engagement surface, wherein the outer actuator knob is disposed on the latch mechanism shaft such that an outer surface of the outer actuator knob is an outer actuator knob height relative to the latch mechanism mount plate;
- a shroud coupled to the latch mechanism mount plate, wherein the shroud is disposed surrounding the outer actuator knob, the shroud including:
  - a lock opening, the lock opening having a width between 0.2 mm and 5 mm greater than a width of a lock body of a removable lock; and
  - a shroud height relative to the latch mechanism mount plate, the shroud height is equal to the outer actuator knob height;
- a metal loop disposed in the lock opening, the metal loop coupled to the latch mechanism mount plate, wherein the lock body of the removable lock includes:
  - a first side, the first side including a shackle cavity; and
  - a straight shackle passing through the shackle cavity, wherein the metal loop aligns with the shackle cavity when the removable lock is placed in the lock opening with a convex lock body engagement surface of the lock body proximate to the at least one concave outer actuator knob engagement surface.

14. A method of locking a latching mechanism comprising:
- placing a rotatable outer actuator knob in a latched orientation, the rotatable outer actuator knob including at least one outer actuator knob engagement surface, the at least one outer actuator knob engagement surface having a shape corresponding to a lock body engagement surface of a lock body of a removable lock, wherein the outer actuator knob is mounted on a latch mechanism shaft, proximate to a first end of the latch mechanism shaft, the outer actuator knob being capable of rotating the latch mechanism shaft; and
- preventing rotation of the outer actuator knob includes:
  - coupling a removable lock to a latch mechanism mount plate, the latch mechanism mount plate being disposed between the outer actuator knob and a latch mechanism, the latch mechanism mount plate including a shaft opening, wherein the latch mechanism shaft passes through the shaft opening, wherein coupling the removable lock to the latch mechanism mount plate includes passing a shackle of the removable lock through a metal loop of the latch mechanism mount plate; and
  - securing the removable lock in a locked position with a lock body engagement surface of a lock body proximate to and engaging an at least one outer actuator knob engagement surface on the outer actuator knob, the at least one outer actuator knob engagement surface wherein the lock body engagement surface has a convex shape having a first radius and wherein the at least one outer actuator knob engagement surface has a concave shape having a second radius substantially equal to the first radius, wherein a lock body of the removable lock includes:
  - a first side, the first side including a shackle cavity;
  - a straight shackle passing through the shackle cavity; and
  - wherein the metal loop is positioned to align with the shackle cavity when the removable lock is positioned with the lock body engagement surface proximate to the at least one outer actuator knob engagement surface.

* * * * *